United States Patent
Fitch et al.

(10) Patent No.: US 11,614,854 B1
(45) Date of Patent: Mar. 28, 2023

(54) MEETING ACCESSIBILITY STAGING SYSTEM

(71) Applicant: Microsoft Technology Licensing, LLC, Redmond, WA (US)

(72) Inventors: Toby Jonathan Fitch, Everett, WA (US); Christopher Michael Sano, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/827,690

(22) Filed: May 28, 2022

(51) Int. Cl.
*G06F 3/048* (2013.01)
*G06F 3/0484* (2022.01)
*H04L 65/1089* (2022.01)
*H04L 65/80* (2022.01)
*H04L 65/1093* (2022.01)
*H04N 7/15* (2006.01)

(52) U.S. Cl.
CPC ........ *G06F 3/0484* (2013.01); *H04L 65/1089* (2013.01); *H04L 65/1093* (2013.01); *H04L 65/80* (2013.01); *H04N 7/15* (2013.01)

(58) Field of Classification Search
CPC ..... H04N 7/15; H04L 65/403; H04L 65/1093; H04L 12/1822; A47B 2200/0079; G06F 3/0484
USPC .................................................. 715/753, 755
See application file for complete search history.

(56) References Cited

U.S. PATENT DOCUMENTS

| | | | | |
|---|---|---|---|---|
| 9,025,927 | B2 * | 5/2015 | Yeh ........................ | H04N 5/783 386/246 |
| 9,264,660 | B1 * | 2/2016 | Petterson ............ | H04L 12/1827 |
| 9,451,210 | B1 * | 9/2016 | Smus .................... | G06V 40/197 |
| 9,900,553 | B2 * | 2/2018 | Whynot ................. | H04N 7/147 |
| 9,942,519 | B1 * | 4/2018 | Pan ......................... | H04N 21/47 |
| 10,970,981 | B2 * | 4/2021 | Robertson ........ | G08B 13/19645 |

(Continued)

OTHER PUBLICATIONS

Vogler et al., "Webinar Accessibility for Deaf and Hard of Hearing People", Oct. 25, 2020,https://www.deafhhtech.org/rerc/webinar-accessibility-for-deaf-and-hard-of-hearing-people/ (Year: 2020)(Year: 2020).*

(Continued)

Primary Examiner — Patrick F Riegler
(74) Attorney, Agent, or Firm — Barta, Jones & Foley, PLLC

(57) ABSTRACT

Examples provide an accessibility manager enabling a persistent floating secondary stage for presentation of user-configurable content during a video conferencing meeting. A primary stage is provided during each video conferencing meeting. The primary stage includes a roster of meeting attendees and an area for displaying shared content. The user creates configurable settings which are used at every meeting to generate a customized secondary stage. The secondary stage is an overlay which persists on the user interface even if the primary stage is minimized as the user multi-tasks during the meeting. The secondary stage displays video feed for one or more selected meeting attendees, such as an interpreter. When an interpreter speaks on behalf of the user, the user receives the active speaker attribution. The configurable settings permit the user to control the secondary stage video feed quality, sizing, aspect ratio, display location, captioning, role designation and active speaker designation.

20 Claims, 19 Drawing Sheets

(56) References Cited

U.S. PATENT DOCUMENTS

| | | | | |
|---|---|---|---|---|
| 10,999,344 | B1* | 5/2021 | Babkin | H04L 65/403 |
| 11,463,499 | B1* | 10/2022 | Fieldman | G06F 3/1454 |
| 2006/0125914 | A1* | 6/2006 | Sahashi | H04N 7/147 |
| | | | | 348/E7.083 |
| 2008/0136896 | A1* | 6/2008 | Graham | H04N 7/15 |
| | | | | 348/E7.083 |
| 2009/0125817 | A1* | 5/2009 | O'Sullivan | G06Q 10/109 |
| | | | | 715/753 |
| 2009/0182889 | A1* | 7/2009 | Hurst | H04L 65/80 |
| | | | | 709/231 |
| 2009/0287790 | A1* | 11/2009 | Upton | H04N 21/812 |
| | | | | 709/208 |
| 2012/0182384 | A1* | 7/2012 | Anderson | H04L 65/1073 |
| | | | | 348/14.09 |
| 2013/0063542 | A1* | 3/2013 | Bhat | H04L 12/1822 |
| | | | | 348/E7.083 |
| 2014/0184731 | A1* | 7/2014 | Bebbington | H04N 7/152 |
| | | | | 348/14.09 |
| 2015/0201161 | A1* | 7/2015 | Lachapelle | H04N 7/15 |
| | | | | 348/14.07 |
| 2019/0087054 | A1* | 3/2019 | Gingawa | G06F 3/0425 |
| 2021/0074298 | A1* | 3/2021 | Coeytaux | H04N 7/147 |
| 2021/0352244 | A1* | 11/2021 | Benedetto | H04N 7/15 |
| 2022/0182579 | A1* | 6/2022 | Fostiropoulos | H04L 65/403 |

OTHER PUBLICATIONS

"Improve Transcription Results with Model Adaptation", Retrieved from: https://cloud.google.com/speech-to-text/docs/adaptation-model#classes, Retrieved on Apr. 29, 2022, 12 Pages.

* cited by examiner

FIG. 14

MEETING ACCESSIBILITY STAGING SYSTEM

BACKGROUND

Video-based remote meetings are frequently held via various video conferencing applications providing real-time video and/or audio of meeting participants. These types of meetings typically have an organizer that sends out meeting invitations which permit invitees to join the meeting. However, some deaf, hard of hearing (HH) and other users may require one or more interpreters to provide translation services during the meeting. These interpreters may not receive timely invitations permitting them to join the call. Moreover, even if included, the deaf or HH meeting participant may experience difficulty locating the interpreter, communicating with the interpreter and/or otherwise seeing the interpreter during the meeting due to small video window size provided for each meeting participant. This may result in video conference calls being cumbersome, inefficient, and frustrating for some users.

SUMMARY

Some examples provide a system for providing a floating secondary stage during video conferencing meetings. The system includes a set of user-configurable settings created by a primary user. The settings are applied to generate secondary stage content. The secondary stage content is presented within a floating secondary stage during a video conferencing meeting with a primary stage associated with the video conferencing meeting. The primary stage includes a plurality of video feeds associated with a plurality of meeting attendees. The primary user is one of the meeting attendees in the plurality of meeting attendees. The display of the floating secondary stage persists on a user interface device within a user-selected location even when the primary stage is minimized. The video quality of a video feed associated with a first meeting attendee within the secondary stage is prioritized over a video feed associated with a second meeting attendee within the primary stage.

Other examples provide a method for a floating secondary stage during video conferencing meetings. A set of user-configurable settings are generated by a primary user. The settings are applied to generate secondary stage content presented within a floating secondary stage during a video conferencing meeting. The floating secondary stage and a primary stage associated with the video conferencing meeting are generated. The primary stage includes a plurality of video feeds associated with a plurality of meeting attendees. The secondary stage persists on a user interface device within a user-selected location while the primary stage is minimized. A video feed associated with at least one interpreter and selected content is visible within the floating secondary stage on the user interface for the duration of the video conferencing meeting.

Still other examples provide a computer readable storage device having computer-executable instructions for a floating secondary stage during video conferencing meetings. A set of user-configurable settings generated by the user are applied to generate a primary stage and a floating secondary stage during a video conferencing meeting. The floating secondary stage includes configurable content. The primary stage includes a plurality of video feeds associated with a plurality of meeting attendees. Display of the floating secondary stage persists on a user interface device within a user-selected location while the primary stage is minimized. An active speaker attribution is provided for the primary user when a designated interpreter speaks during the video conferencing meeting on behalf of the primary user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 14 is an exemplary screenshot illustrating an active speaker attribution associated with a primary user while an interpreter is speaking on behalf of the primary user.

Corresponding reference characters indicate corresponding parts throughout the drawings.

DETAILED DESCRIPTION

Figure 1:
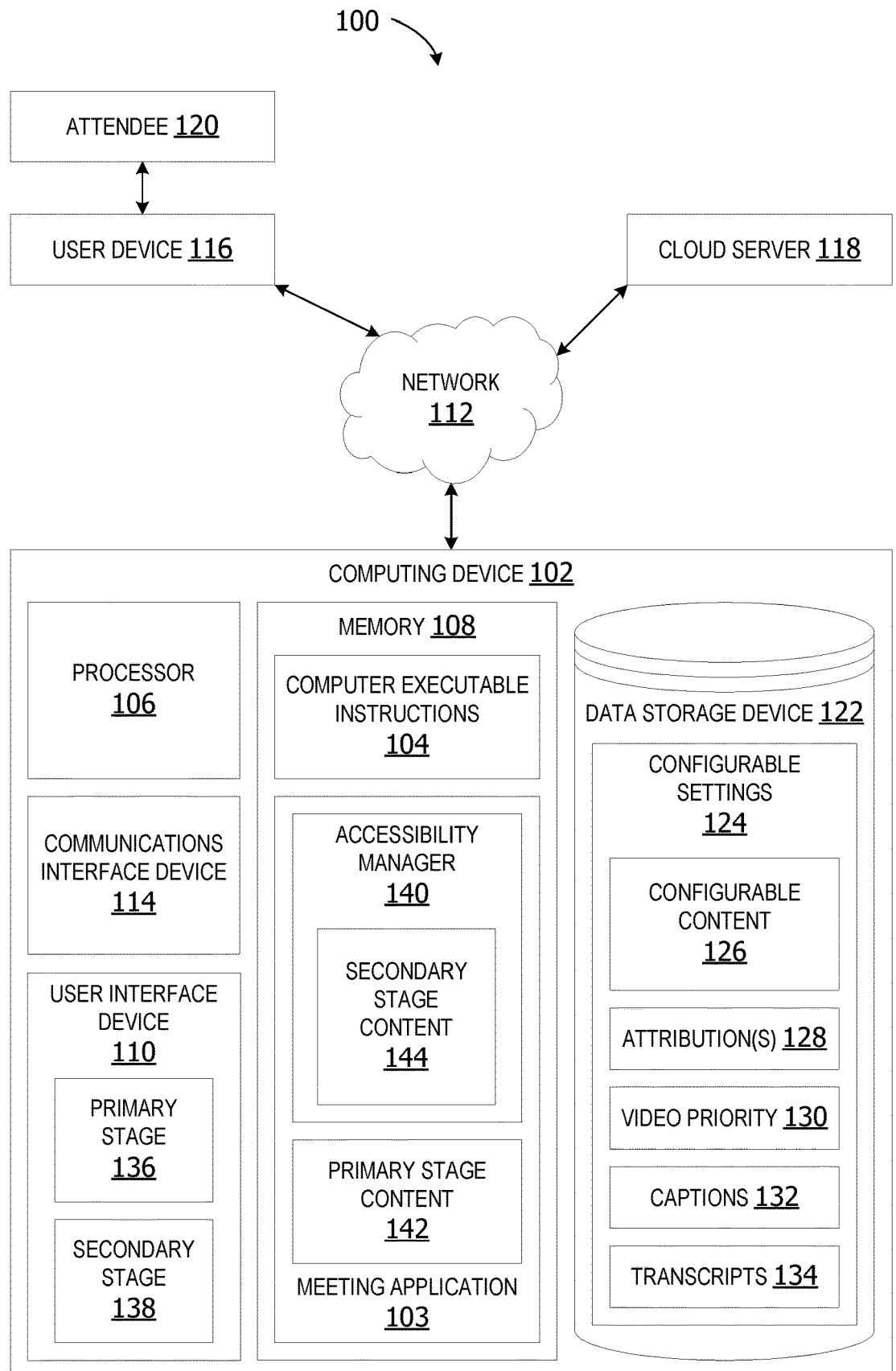
FIG. 1 is an exemplary block diagram illustrating a system for providing a floating in-meeting accessibility stage containing per-user customized content and persistent settings across meetings.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

Some deaf and hard of hearing (HH) attendees of remote or video conferencing meetings use sign language and require an interpreter to translate spoken language into sign and vice versa. These users may depend on one or more interpreters for bi-directional communication and/or ancillary support. Other attendees may attempt to use lip reading, captions, transcription services or a combination of these tools. For example, a deaf or HH user may rely on an interpreter for receptive information but express themselves in spoken language. Likewise, a HH user may rely upon audio output with additional lip reading, captions and/or transcription services as a supplement to the audio. However, lip reading, captioning and transcripts can be inaccurate and unreliable.

Other meeting attendees may be blind, have low vision or other vision-related disabilities. These meeting attendees may require an interpreter to provide visual description services, note taking services or other assistance.

Interpreting/translation scenarios are often awkward and confusing for users involved in multilingual settings. Users of video conferencing applications are often left to their own creative solutions when they have a need for human translators/interpreters or other support provider to facilitate conversations between two or more parties that may not speak the same language. A support provider includes any user assisting another user. A support provider user can include a translator, interpreter, assistant, note-taker, live captioner, or any other support person. A translator can include a sign language translator or a foreign language translator, such as a French translator for a user that speaks a different language than one or more of the other meeting attendees.

The support provider, such as translators and/or interpreters, are often confused as participants in meetings, which leads to awkward interactions and unnecessary bias by meeting participants. For example, some deaf/HH users, are forced to use a second video conferencing application (often on another computing device) with sign language interpreters to be able to participate in meetings. This is cumbersome and inconvenient for users.

Referring to the figures, examples of the disclosure enable a floating accessibility stage during video conferencing meetings. In some examples, the accessibility stage enables a user to select the video feed of one or more meeting attendees, such as translators or interpreters, to populate the floating accessibility stage. This enables the user to have greater control over the size, video quality, audio, location, and aspect ratio of the selected meeting attendees' video feed for greater accessibility and improved meeting experience.

Aspects of the disclosure further enable configurable accessibility stage settings permitting the user to persist their setting preferences across multiple different meetings. In this manner, the user does not have to re-set or readjust the various aspects of the accessibility stage content for each new meeting. This provides greater efficiency and convenience for users while making translation scenarios a frictionless and seamless experience for users.

In some aspects, the system provides a collective of improvements that builds an inclusive experience for meeting attendees using translators and/or sign language interpreters, such as, but not limited to, a pop out accessibility stage window, configurable settings, speaker attribution, role designation and caption settings. Captions includes captioning in real time by a human generating captions. The captioning can also include systems/artificial intelligence generated captions.

The pop out accessibility stage provides a separate concurrent video call window popped out of the main stage, for users to communicate with interpreters/translators. In this manner, a private side channel is provided such that the user is no longer required to utilize two separate meeting applications on multiple devices to accommodate two or more interpreters and their need for a separate side channel. In this manner, users are also empowered to participate in a way they want (i.e.: have the video off in primary stage, while video can be on in secondary stage for translation purposes). This would put deaf/HH users on an equal footing to hearing counterparts.

Other examples provide customizable accessibility/language settings to empower deaf and HH users, interpreters, and other users requiring language translation services. The speaker attribution assigns audio of a user using interpreters/translators to the primary user rather than to the interpreter/translator. An icon indicates the correct identification of the user being translated and the user performing the translation. This can be turned on/off by the user. Other indicators include visual signals/cues, like a halo or colored bubble around the video feed of the primary user rather than having these indicators associated with the interpreter or other support provider that may be speaking on behalf of the primary user. In this manner, the primary user is acknowledged and provided appropriate attribution to give these users stage presence during meetings.

In other examples, role designation feature creates specific settings/viewpoints depending on the intended use. For example, speaker vs non-speaker roles, or viewer (user needing support) vs. support roles (interpreters/translators, notetakers, assistants), and default participants (no role designation applied). Depending on the user role designation, the accessibility manager maps users to the correct features/functions based on the configurable settings, such as placing the video feed on the accessibility stage, providing captions at the start of the meeting automatically, etc. The captions are configurable enabling the user to configure captions to be activated automatically, select the location for captions display, move captions around, scroll back captions, etc. This provides a smoother and more user-friendly experience for meeting attendees.

The accessibility manager executing on a computing device utilizes the user-configured settings to re-create the user's accessibility stage content, location, speaker attributions, role designations, caption settings, transcript settings and other configurable options automatically at the start of each video conferencing meeting. The accessibility manager operates in an unconventional manner by providing the floating accessibility stage in accordance with each user's preferred settings. In this manner, the computing device operates in an unconventional manner by persisting the floating accessibility stage with the selected user's video feeds and allows deaf and hard of hearing (HH) users a smoother and more inclusive meeting experience, thereby improving the functioning of the underlying computing device.

Referring again to FIG. 1, an exemplary block diagram illustrates a system 100 for providing a floating in-meeting accessibility stage containing per-user customized content and persistent settings across meetings. In the example of FIG. 1, the computing device 102 represents any device executing computer-executable instructions 104 (e.g., as application programs, operating system functionality, or both) to implement the operations and functionality associated with the computing device 102. In this example, the computing device 102 supports a video-based meetings application 103 for supporting in-person and remote meeting attendees. The meeting application 103 can be implemented as any type of video and/or audio-based meeting application, such as, but not limited to, Microsoft Teams® or any other type of meeting hosting application.

The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 3, FIG. 4, and FIG. 5).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116 and/or a cloud server 118, can occur using any protocol or mechanism over any wired or wireless connection. In some examples, the communications interface device 114 is operable with short range communication technologies such as by using near-field communication (NFC) tags.

The user device 116 represent any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface device.

In this example, the user device 116 is a computing device associated with a meeting attendee 120 attending a virtual meeting. The user device 116 includes an instance of the meeting application 103 enabling the attendee 120 to receive audio and/or video associated with one or more other meeting attendees attending the meeting either in-person or remotely via one or more computing devices, such as the computing device 102 and/or the user device 116. The user device 116 optionally includes a user interface device for providing audio of one or more meeting attendees and/or displaying video of shared content and/or video of one or more other meeting attendees.

The cloud server 118 is a logical server providing services to the computing device 102 or other clients, such as, but not limited to, the computing device 102 and/or the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The system 100 can optionally include a data storage device 1122 for storing data, such as, but not limited to configurable settings 124 created by a user. The configurable settings 124 are customized meeting settings created by the user and stored or persisted for application by the meeting application 103 across all meetings attended by the user. In this example, the per-user configurable settings 124 includes settings associated with configurable content 126, speaker attribution(s) 128, video priority 130, captions 132 and/or transcripts 134 settings.

The configurable content 126 settings refer to settings for configuring content which is displayed within the primary stage 136 and/or the secondary stage 138. The primary stage 136 is the main stage on which shared content is displayed. The primary stage 136 optionally includes a roster of attendees and/or video of one or more meeting attendees. The secondary stage 138 is a customizable floating stage which can be positioned anywhere on the user interface device display by the user. The secondary stage 138 includes video of a primary interpreter, assistant, or other selected user(s). The secondary stage 138 configurable content 126 can also include a captions window showing captions of the meeting dialogue, transcripts of the meeting dialogue, descriptive video service audio, and/or any other type of customized content configured by the user for presentation via the persistent, floating secondary stage. The secondary stage 138 may also be referred to as an accessibility stage.

The secondary stage is persistent regardless of whether the primary stage is minimized or not. The secondary stage is always on top of any application which is displayed on the user device. In this manner, the secondary stage persists throughout the duration of the meeting.

The speaker attribution(s) 128 setting is a setting the permits a user to designate speaker attribution of one or more interpreters to the primary user. A name of the primary user that is utilizing one or more interpreters receives attribution as the speaker when the interpreter speaks rather than the name or video of the interpreter receiving the indicators of an active speaker. For example, if the primary user is a deaf or hard of hearing (HH) user, the active speaker designation is attributed to the primary user while the interpreter is speaking on behalf of the deaf or HH user. The active speaker attribution can include a light, halo or circle around a video feed or icon representing the primary user. The active speaker attribution can also include a name on a transcript, name on a caption and/or active speaker name on the primary stage 136.

The video priority 130 setting permits the user to set priority for video displayed on the secondary stage 138 or the primary stage 136. For example, if the video for the primary sign language interpreter is given the highest video quality setting, the accessibility manager 140 prioritizes the display quality for the primary interpreters video feed to ensure the video feed for the primary interpreter does not freeze, slow down, or otherwise deteriorate. Video quality can be of great importance in scenarios where a meeting attendee is deaf or HH. If video quality deteriorates, access to interpreters deteriorates. If video becomes choppy, blurry, freezes, or is otherwise unavailable, access to meeting content and meeting participation is impeded. This applies to those who rely on being able to see others sign and/or be able to read their lips.

This ensures the video of the primary interpreter signing to the primary user is presented in the secondary stage 138 with the best available video quality. As used herein, the term interpreter includes interpreters and interpreters. The term interpreter includes spoken language interpreters, as well as sign language interpreters, verbal description services, note taking services, as well as any other services or other accommodations provided to meeting attendees.

In other examples, the user can temporarily or permanently designate the video feed for one or more meeting attendees in the primary stage for prioritized video quality. In other words, the user can 'boost' a person's video feed on the primary stage for improved video quality of the video feed. For example, if a user is in a small meeting, the user can boost a specific person's video feed by right clicking on the video feed to prioritize video. Video prioritization means that person's video feed is first in order in the primary stage, making it the most visible (as opposed to being hidden out of view) in large meetings. In an exemplary scenario, if four deaf people are in a meeting within a large meeting of twenty or more people and the user has a concurrent call with one or more interpreters while the other deaf meeting attendees have concurrent calls with their own interpreters (not the same interpreters as the primary user). The primary user can prioritize the deaf meeting attendees video feeds in the primary stage to enable the primary user to see them without other meeting attendees in the main meeting seeing the interpreters.

The configurable settings 124 permit the user to set captions 132 to turn on automatically at the beginning of each meeting and remain on throughout every meeting. The configurable settings 124 likewise permit the user to turn on transcripts 134 for every meeting automatically. In this manner, the user does not have to manually re-activate transcripts and/or captions at the beginning of each meeting. In this manner, the users configured settings are automatically applied to every meeting the user attends.

The configurable settings 124 are applied in each meeting to adjust primary stage content 142 displayed on the primary stage 136 and/or secondary stage content 144 displayed on the secondary stage 138 in accordance with the user's preferences. The configurable settings 124 in this example are stored on the data storage device 122. In other examples, the configurable settings 124 can be stored on a cloud storage or any other data store.

The data storage device 122, in other examples, can include one or more different types of data storage devices, such as, for example, one or more rotating disks drives, one or more solid state drives (SSDs), and/or any other type of data storage device. The data storage device 122 in some non-limiting examples includes a redundant array of independent disks (RAID) array. In other examples, the data storage device 122 includes a database.

The data storage device 122 in this example is included within the computing device 102, attached to the computing device, plugged into the computing device, or otherwise associated with the computing device 102. In other examples, the data storage device 122 includes a remote data storage accessed by the computing device via the network 112, such as a remote data storage device, a data storage in a remote data center, or a cloud storage.

In this manner, the accessibility manager enables a user to designate roles (speaker roles, non-speaker roles, etc.), provide a pop-out accessibility window (secondary stage) that is always displayed as an overlay on top mode with the ability to pin specific video streams, attribute/animate the correct speech bubble for the correct speaker (not interpreter) and the ability to enable captions automatically, customize captions, move captions around, scroll back captions, etc. The secondary stage can always be viewed overlayed on top of any application during the meeting. This is a setting that can be turned on/off.

Figure 2:
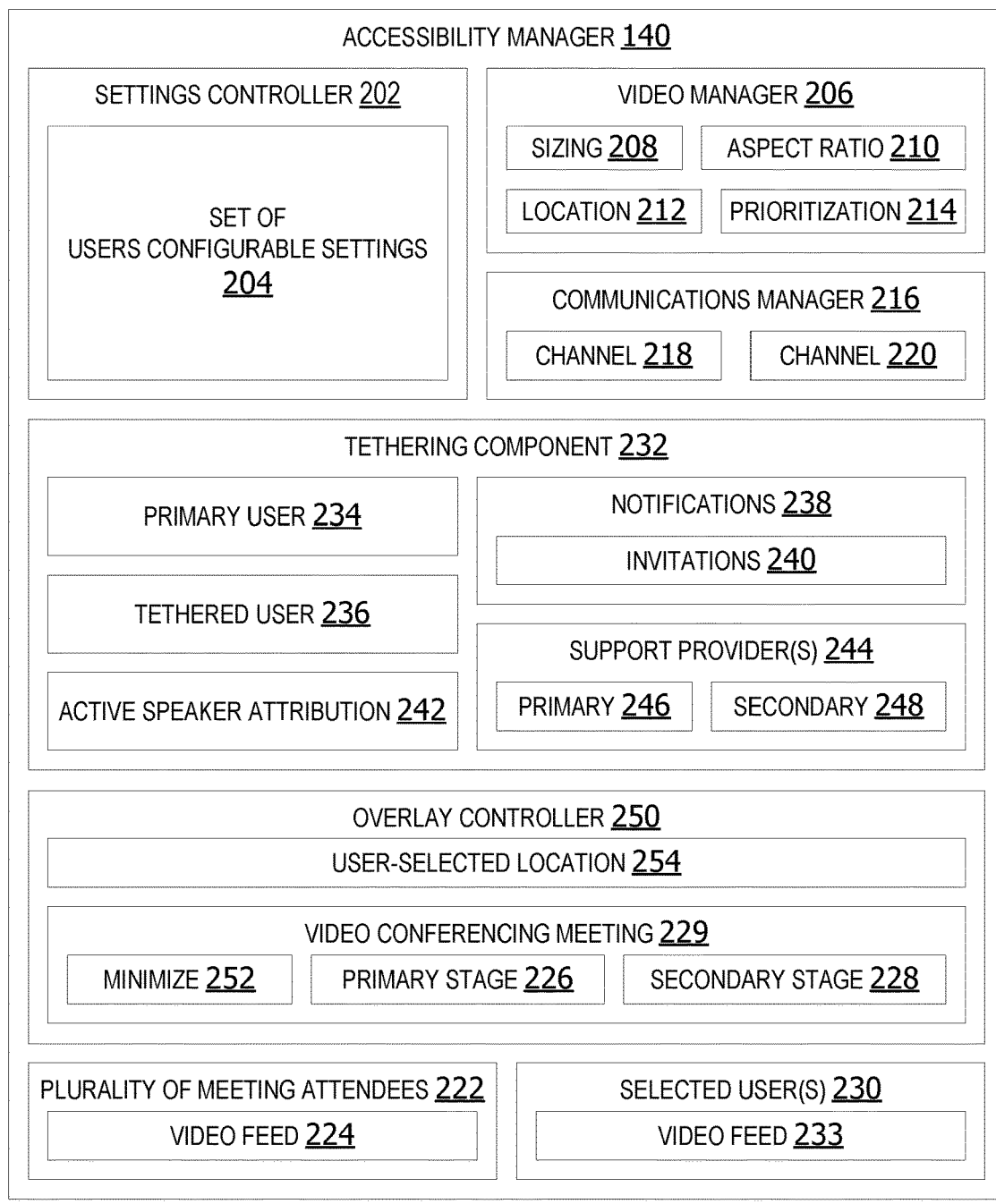
FIG. 2 is an exemplary block diagram illustrating an accessibility manager providing a floating secondary stage of user-configured content during a video conferencing meeting.

Turning now to FIG. 2, an exemplary block diagram illustrating an accessibility manager providing a floating secondary stage of user-configured content during a video conferencing meeting is shown. In some examples, the accessibility manager 140 includes a settings controller 202. The settings controllers 202 enables the primary user to create a set of one or more user-configurable settings 204 which are applied to all meetings which the primary user attends. In some examples, the set of user-configurable settings 204 includes configurable settings for controlling active speaker attributions, video priority, whether captions are turned on or turned off, whether transcripts are turned on or turned off, etc.

A video manager 206 in other examples enables the user to set customized video display configurations, such as, but not limited to, video feed sizing 208, aspect ratio 210 of each video feed, display location 212 of each video feed within the secondary stage and/or prioritization 214 of video quality of one or more video feeds within the secondary stage.

A communications manager 216 enables provision of one or more private communications channels for utilization of the primary user and one or more support provider, such as, translators, interpreters, assistants, video description providers, or other tethered users associated with the secondary stage. In this example, a channel 218 is an open communication channel permitting the primary user to communicate with one or more of the attendees in a plurality of meeting attendees 222 having their video feed 224 displayed within the primary stage 226 during the video conferencing meeting 229.

The plurality of meeting attendees 222 can include any number of attendees. In some examples, the plurality of attendees can include two or more attendees. In still other examples, the plurality of meeting attendees 222 can include dozens or even hundreds of meeting attendees.

During an interpreting task, the active interpreter frequently relies on the support interpreter to "feed" them missed information, provide clarification, and technical vocabulary. The support interpreter often serves as the voice of the primary user (deaf/HH) user with support from the active interpreter. By separating the signing from the voicing, this allows the support interpreter to find a natural point in the current discussion for the D/HH participant to interject while simultaneously allowing the participant to process the lag in interpretation from the active interpreter. However, open conversation between the primary user and the interpreters would be disruptive to the rest of the meeting attendees. Therefore, the private communications channel provided via the secondary stage enables the primary user and the interpreter(s) to communicate without disrupting the main meeting.

In this example, the communication channel 220 is a private communication channel permitting the primary user to communicate privately with one or more selected users 230 tethered to the secondary stage 228. A selected user is tethered to the secondary stage if a video feed 233 of the selected user is displayed within the secondary stage 228. When the user communicates via the private channel 220, the plurality of attendees 222 associated with the primary stage do not hear the conversation or see the video feed 233 transmitted via the private communication channel 220. This enables the primary user to speak privately to the interpreters. This also permits the interpreters to communicate with each other for clarification purposes without interrupting the primary meeting being held via the primary stage.

A tethering component 232 in some examples permits the primary user 234 to tether one or more other users to the secondary stage 228. A tethered user 236 receives notifications 238, including meeting invitations whenever the primary user receives the meeting invitations. In other words, the tethered user is automatically copied or included in all meeting invitations issued to the primary user. A video feed of the tethered user can also optionally automatically be included within the secondary stage whenever the tethered user 236 joins the video conferencing meeting 229.

In other examples, the tethering component 232 enables active speaker attribution 242 of the primary user 234 whenever the tethered user 236 interpreter speaks on behalf of the primary user during the video conferencing meeting 229. In this manner, the primary user receives appropriate acknowledgement and attribution when an interpreter verbally translates sign language of a deaf or HH primary user. In some examples, support provider(s) 244 are tethered to the primary user. Support provider(s) 244 include one or more support providers. A support provider can include an interpreter, an assistant, a note-taker, a live captioner, or any other type of support provider.

In this example, a primary support provider 246 and a secondary support provider 248 are utilized by the primary user. One support provider can be given a higher priority with regard to video quality, a larger window within the secondary stage for displaying the interpreters video feed, a higher aspect ratio, etc. In such cases, the first support provider can be referred to as a primary support provider while the other support provider is a secondary support provider.

In other examples, all the support providers can be given equal priority. In such cases, all the support providers have equal priority. This primary user can optionally designate all support providers have higher priority than non-support provider meeting attendees with regard to video quality, etc. This makes it easier for the primary user to view the primary interpreter providing translation to the primary user.

In this example, the support provider include two users, a primary support person and a secondary support person. However, the examples are not limited to two support provider. In other examples, three or more support provider are tethered to the primary user.

In other examples, any or all tethered users in the secondary stage can be given higher priority with video quality, etc. For example, a user may give priority for good video quality for the interpreter speaking on behalf of the primary user while also assigning video quality priority for the interpreter who is signing to the primary user. The interpreter speaking for the primary user may need high quality video if there needs to be clarification while speaking for the primary user. This ensures the video of both interpreters are clear and not low quality.

In still other examples, an overlay controller 250 is a software component that persists the secondary stage such that the secondary stage remains visible to the primary user even when the primary user minimizes 252 the primary stage in response to user controls. In other words, the user controls whether the secondary stage is persistent or not.

The primary stage may be minimized, or the user may navigate to another application. For example, the user may navigate away from the video conferencing application to check email, search for a document to share during the meeting, search for needed information on the Internet, or otherwise multi-tasking during the video conferencing meeting. In these examples, the secondary stage is persisted in a user-selected location 254 which can be moved or re-located to any position on the user's screen during the video conferencing meeting.

In some examples, a user pins one or more meeting attendees to the secondary stage for inclusion in the secondary stage. The user optionally sets one of the pinned videos to the highest priority. When transitioning to different stage scenarios, if there is not be enough space to show the same number of pinned videos without compromising access, the highest priority pinned users are given preference for presentation in the secondary stage. Alternatively, a user can pin a group of users to the secondary stage with the highest priority. Pinning a group of users permits a pre-determined number of users to be added to a group. This group gets priority across the different scenarios.

Prioritized videos, in some examples, are given priority placement on stage. Content is resizable to allow more room for videos. Users are able to decide for themselves when/where to make the trade-off between content and videos. The user can resize the content view so that they can get larger video(s) or fit more videos at the desired size/aspect ratio.

In other examples, the accessibility manager enables the user to drag and drop individual videos or groups of videos on the secondary stage. The user can switch positioning of sign language interpreters or move groups of signing users to different parts of the stage to make it easier to watch/follow everyone. In one example, the user can position video within the secondary stage to ensure that all the important videos/content windows are in the same eye line.

Signing participants do not always know each other prior to joining the meeting, especially in larger events, such as town hall meetings. In cases, interpreter indicators may be provided on the meeting attendee roster or interpreter videos may be placed in pre-defined slots to make it easier for them to find each other. In other examples, the secondary stage may be automatically turned on at the beginning of each meeting, with the video feed for the interpreter(s) already activated within the secondary stage.

The user can optionally specify that one or more of the tethered user video feeds be maintained at a given aspect ratio, such as, but not limited to, a 16:9 aspect ratio. This ensures the video layout respects signing space. With the sign language user centered in the video with their elbows extended horizontally, the 16:9 aspect ratio provides adequate space between the ends of the elbows and the outer region of the video. Sometimes the pre-determined video layouts are not at a satisfactory viewing size despite being at the correct aspect ratio. The accessibility manager supports user-customized resizing video anywhere on the stage while also maintaining the aspect ratio.

As discussed above, the user's stage preferences and other user-configured settings are persisted across meetings. Users do not have to configure their stage at the beginning of/during every meeting. If they pin someone in a certain place, at a certain size, those preferences remain in place across scenarios and meetings. Likewise, active speaker attribution settings are persisted across meetings to give sign language users stage presence by identifying them as active speakers when they are engaging via sign language during meetings.

In other examples, the accessibility manager ensures all signing videos are of the highest quality. When legibility is impacted, access is impacted. Therefore, the video feed of signing users is prioritized with regard to video quality. The user can select one or more video feeds for prioritization of video quality. The accessibility manager can optionally also utilize image processing to automatically identify signing users and prioritize videos if video quality begins to decrease. This could mean lowering the quality of other non-prioritized video feeds or completely turning off non-interpreter videos feeds.

Likewise, the settings permit the user to selectively turn off the audio and/or the video on one or more video feeds associated with one or more meeting attendees while selectively turning on the video associated with one or more other meeting attendees, such as, interpreter video feeds. In other variations, the settings permit the user to turn on/off (individual) video, turn on/off all non-interpreter videos, turn on/off spotlighted video(s), etc. In this example, the user can selectively disable video feed of one non-interpreting meeting attendee while maintaining the video feed for an interpreter or other meeting attendee.

Other settings enable the user to customize live captions/transcripts. For example, the user is able to re-position captions and the transcript view, e.g., closer to interpreters so that the user can easily view both. The user can also re-size the captions view, making the captions window larger, smaller, longer, or shorter. For example, the user may stretch the caption window to increase the number of words and/or the length of sentences presented on each line of text within the captions view. The captions and/or transcripts can also have its own dedicated window.

In other examples, the accessibility manager provides a dedicated active speaker slot for spotlighting an active speaker. This enables users that lip-read to quickly and easily keep track of the person actively speaking when the active speaker is constantly changing during the course of a conversation. The active speaker video is always be displayed in the active speaker slot. In cases where interpreter(s) are involved, users are able to position the active speaker video in the same eye line as the interpreter(s).

In still other examples, if the user is assigned to a break-out room or an overflow room during a meeting, tethered users are also assigned to the same break-out room or overflow room automatically. The accessibility manager ensures the interpreters, and the primary user are grouped together for transfer to the same break-out room or overflow meeting room. Likewise, user settings associated with captions and transcripts are applied in the break-out room and/or overflow room just as they are applied in the main meeting room. Thus, the secondary stage containing the video feed for the users interpreters is available within the break-out room or overflow room just as it is available in the original meeting.

Figure 3:
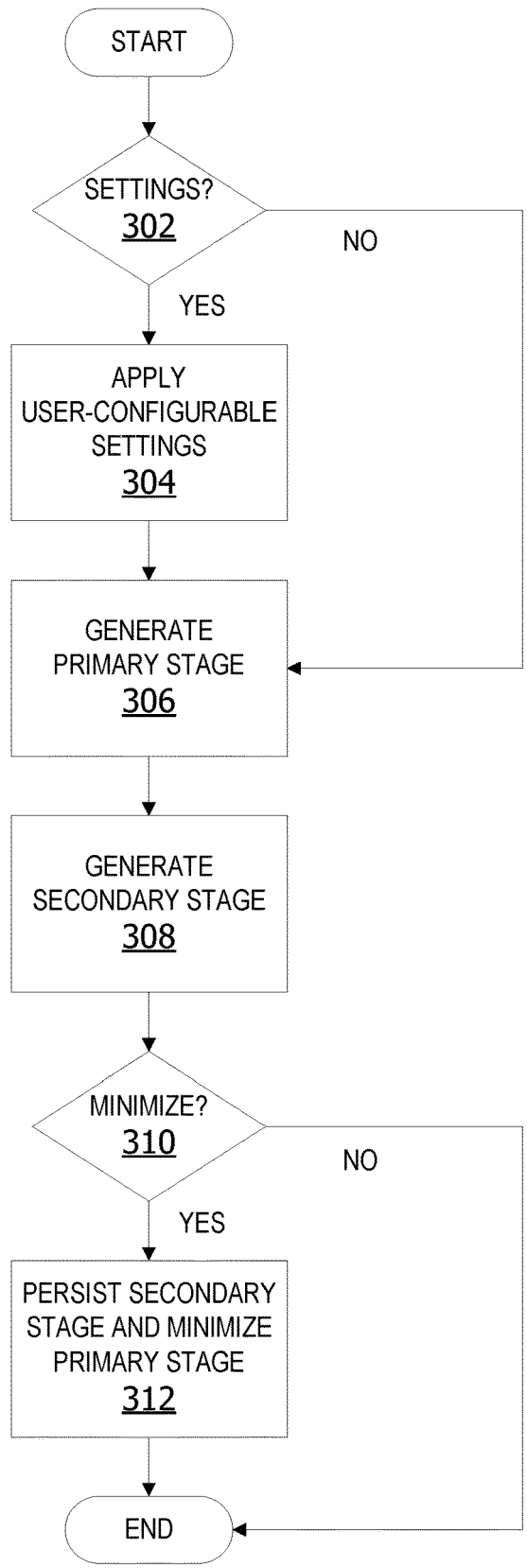
FIG. 3 is an exemplary flow chart illustrating operation of the computing device to provide a persistent secondary stage during a video conferencing meeting.

FIG. 3 is an exemplary flow chart illustrating operation of the computing device to provide a persistent secondary stage during a video conferencing meeting. The process shown in FIG. 3 is performed by an accessibility manager, executing on a computing device, such as the computing device 102 in FIG. 1 and/or the user device 116 in FIG. 1.

A determination is made whether user-configurable settings are provided by the user at 302. In some examples, the user-configurable settings are provided in a user profile or other pre-generated settings file in data store, such as, but not limited to, the data storage device 122 in FIG. 1. If there are user-configured settings, the user-configurable settings are applied at 304. A primary stage is generated at 306. A secondary stage is generated at 308 in accordance with the user-configured settings. A determination is made whether to minimize the primary stage at 310. If yes, the primary stage is minimized and the secondary stage is persisted within the user interface at 312. In this manner, the secondary stage remains visible to the primary user even if the primary user navigates away from the video conferencing application and opens an email application, web browser or other application. In other words, the secondary stage has the ability to persist (remain visible) regardless of the configuration of the primary stage. The process terminates thereafter.

In this example, the concurrent call (secondary stage) does not end unless the primary meeting ends. In other examples, the secondary stage with the subset of meeting attendees (support provider(s) and primary user) can begin prior to the primary meeting and/or continue after the primary meeting ends. In other words, the secondary stage can enable a pre-meeting call and/or a post-meeting call while still being tied to the primary meeting.

While the operations illustrated in FIG. 3 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 3.

Figure 4:
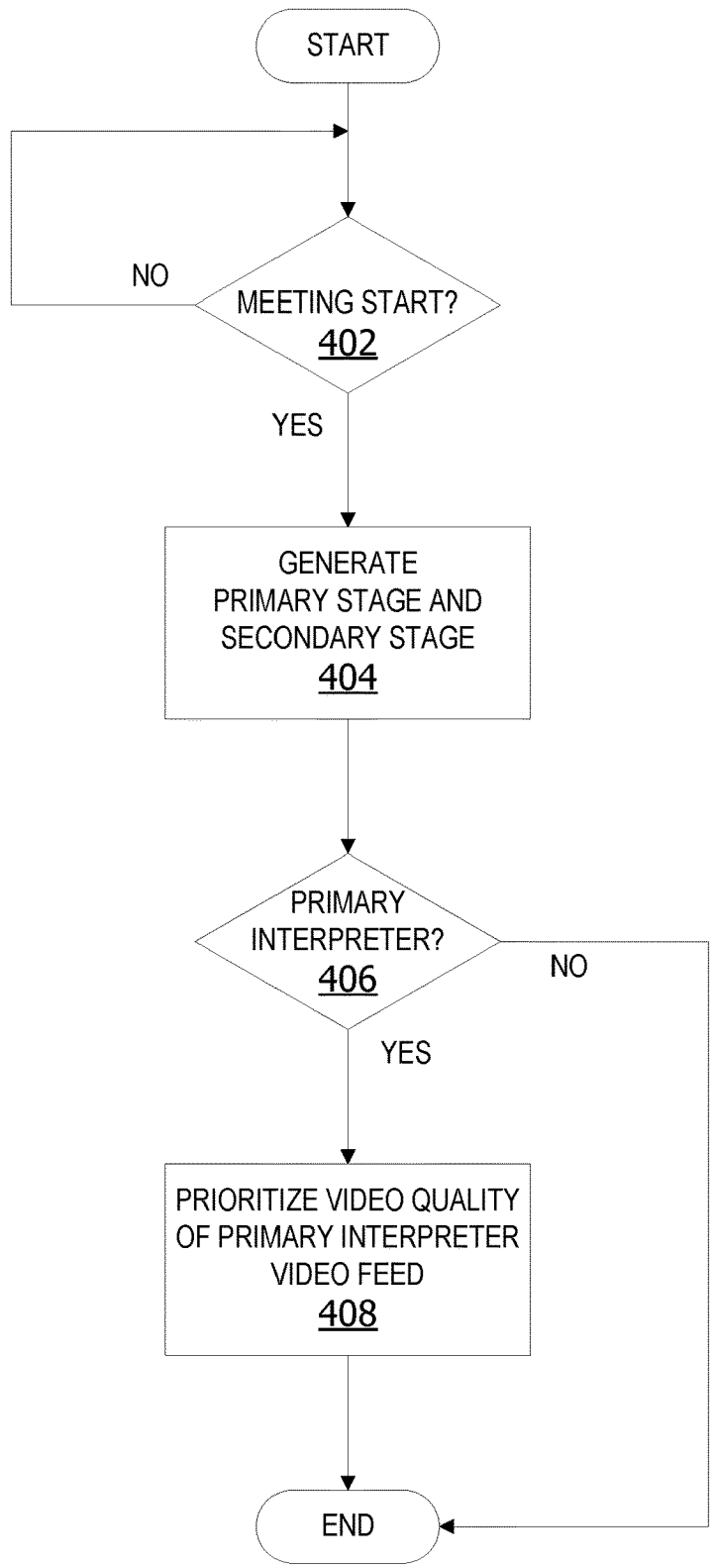
FIG. 4 is an exemplary flow chart illustrating operation of the computing device to prioritize video quality of a primary interpreter in a secondary stage.

Turning now to FIG. 4, an exemplary flow chart illustrating operation of the computing device to prioritize video quality of a primary interpreter in a secondary stage is shown. The process shown in FIG. 4 is performed by an accessibility manager, executing on a computing device, such as the computing device 102 in FIG. 1 and/or the user device 116 in FIG. 1.

The process begins by determining if a meeting start is reached at 402. If the meeting is started, a primary stage and a secondary stage is generated at 404. The primary stage includes a roster of all the meeting attendees. The secondary stage includes the user-configured contents, such as a video feed of one or more interpreters, captions, transcript, or other user-selected content to assist the user during the meeting. A determination is made whether a primary interpreter is designated by the primary user for prioritization of video quality at 406. If yes, the video quality of the primary interpreter video feed is prioritized at 408. Prioritizing the primary interpreter video feed prevents or minimizes the primary interpreter video freezing or otherwise having poor video quality. The process terminates thereafter.

In this example, the primary stage and secondary stage are generated at the start of the primary meeting. However, in other examples, the secondary stage may be generated as a pre-meeting call prior to the beginning of the primary meeting. For example, there may be a pre-call which would permit the interpreters to test their microphones and for the primary user and interpreters to establish context prior to joining the main meeting. Likewise, when the main meeting ends, there may be some wrapping up after the call. In such cases, the secondary stage may continue until all the users tethered to the secondary stage end the secondary stage meeting or the secondary stage is closed by the primary user.

The video quality is prioritized for a primary interpreter in this example. However, the examples are not limited to an interpreter. In other examples, any support provider video feed can be prioritized. Likewise, the primary user can prioritize the video feed of multiple support providers. The examples are not limited to prioritizing a single primary interpreter's video feed.

While the operations illustrated in FIG. 4 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 4.

In FIG. 4, the video quality of a designated support provider is prioritized. In other examples, the video quality of any designated meeting attendee is prioritized by the system. In other words, the primary user can designate the video feed of any one or more meeting attendees for prioritization.

In some examples, the video of a meeting attendee is prioritized via user accessibility settings by the primary user when the meeting attendee (support provider) is present in the meeting with the primary user. The user can optionally designate two or more support providers for prioritization rather than a single meeting attendee.

In other examples, the primary user designates a meeting attendee for video quality prioritization by right clicking on the video feed during the meeting to add the meeting attendee a designated attendee for prioritization, where the meeting attendee has not already been designated in the primary user's personalized settings. In this manner, the user can designate a meeting attendee as a prioritized user with regard to video quality in the settings before the meeting or via a menu option during the meeting.

Figure 5:
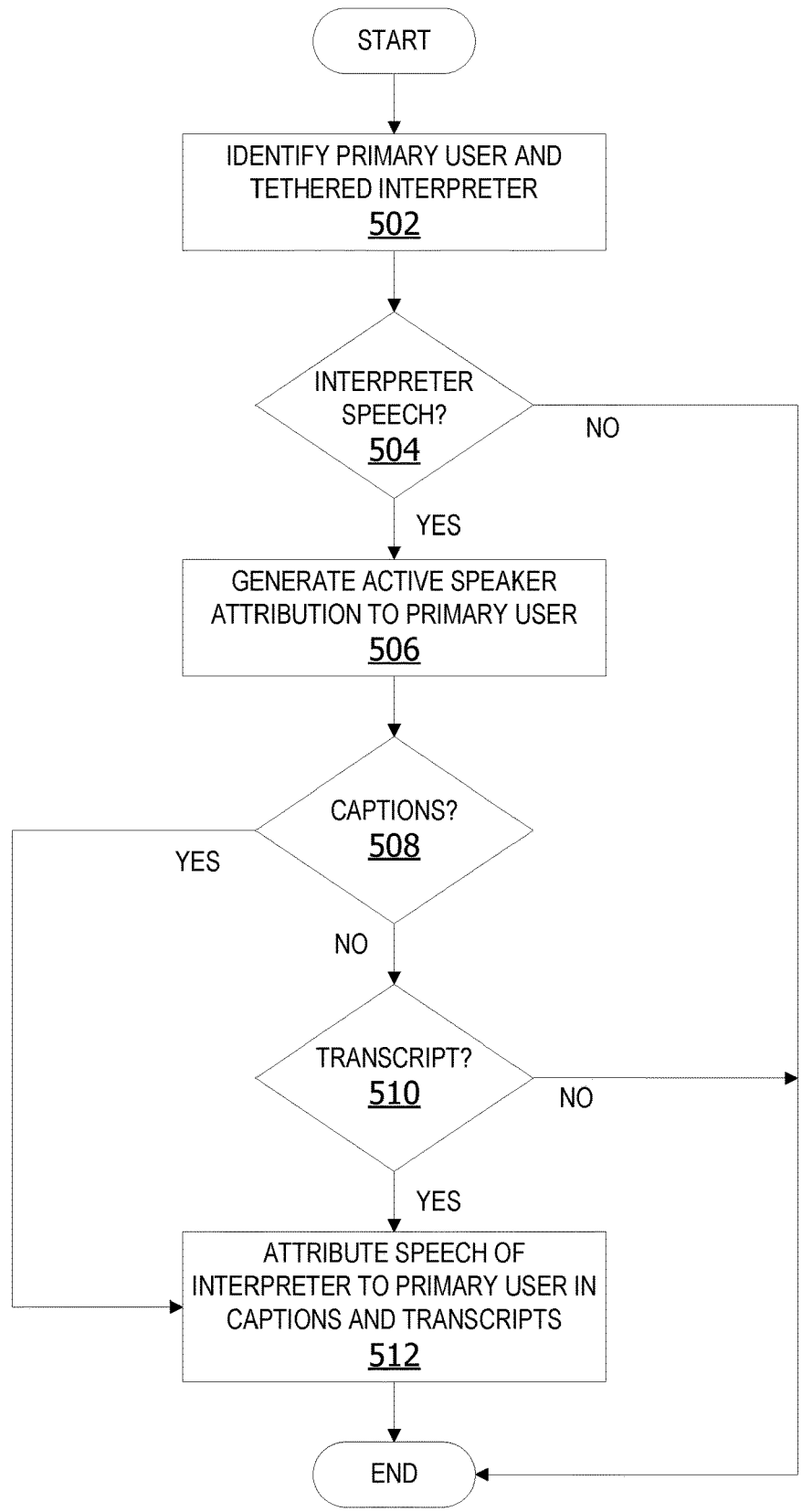
FIG. 5 is an exemplary flow chart illustrating operation of the computing device to provider active speaker attribution to a primary user when an interpreter is speaking on behalf of the primary user.

FIG. 5 is an exemplary flow chart illustrating operation of the computing device to provider active speaker attribution to a primary user when an interpreter is speaking on behalf of the primary user. The process shown in FIG. 5 is performed by an accessibility manager, executing on a computing device, such as the computing device 102 in FIG. 1 and/or the user device 116 in FIG. 1.

The process begins by identifying a primary user and a tethered interpreter at 502. In some examples, the primary user designates the interpreter via the user-configurable settings. A determination is made whether the interpreter is speaking at 504. If yes, an active speaker attribution is generated identifying the primary user as the speaker rather than the interpreter at 506. A determination is made whether to provide captions at 508 or a transcript at 510. If captions and/or a transcript is being provided, the system attributes the speech of the tethered interpreter or other support provider to the primary user in the captions and/or in the transcripts at 512. The process terminates thereafter.

In this example, the attribution is applied for both captions and transcripts simultaneously, if both are being provided. The attribution to the primary user is included in the captions, as well as in the transcripts.

While the operations illustrated in FIG. 5 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 5.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

Figure 6:
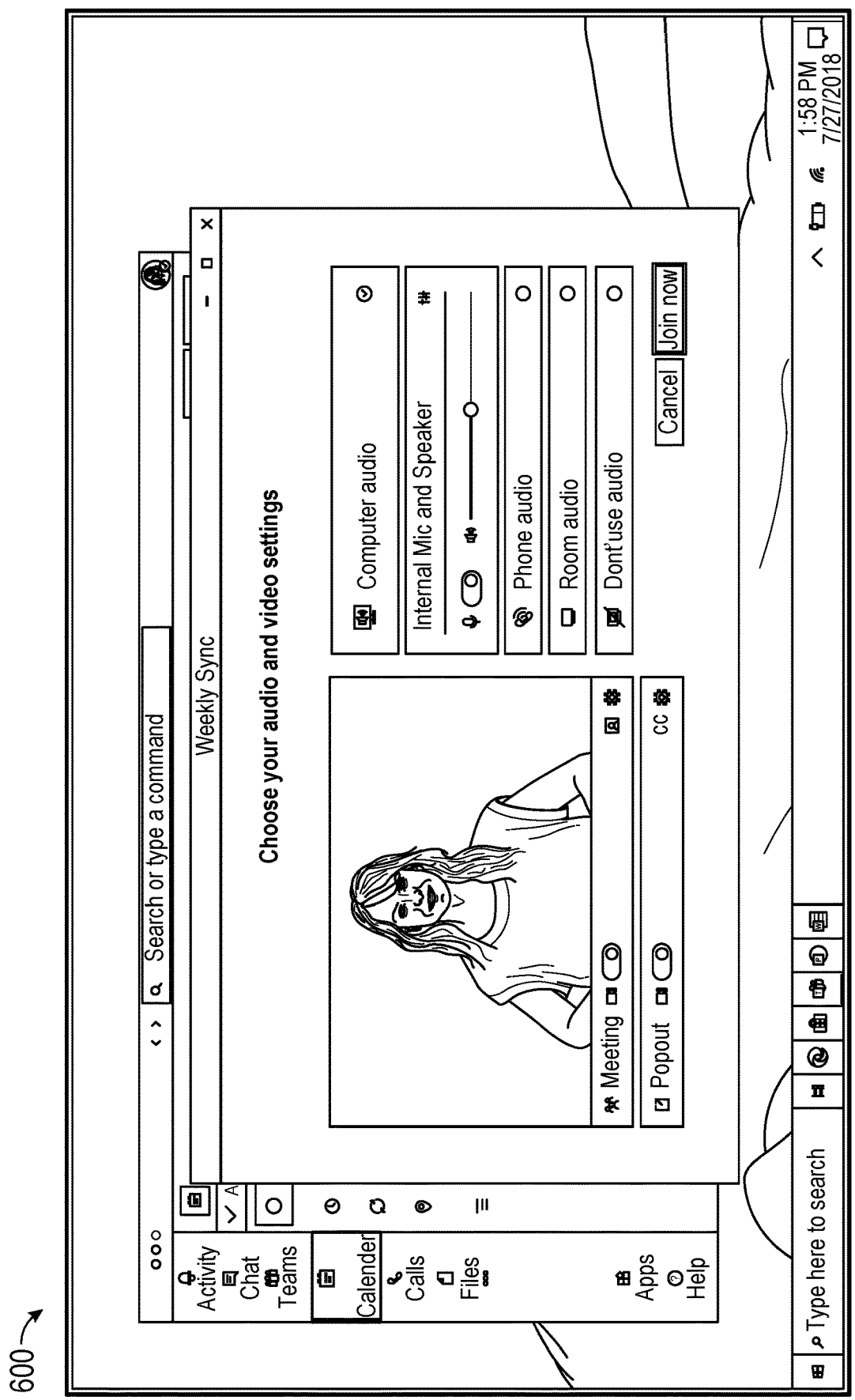
FIG. 6 is an exemplary screenshot illustrating an initial screen prior to a user joining a meeting via a meeting application including an accessibility manager.

Turning now to FIG. 6, an exemplary screenshot 600 illustrating an initial screen prior to a user joining a meeting via a meeting application including an accessibility manager is shown. When the user joins the call, the initial screen provides a set of buttons associated with "Meeting" for turning on a camera/video feed associated with the primary stage. Another set of buttons associated with "Pop out" is provided to turn on a camera/video feed associated with the secondary (accessibility) stage. Likewise, settings are provided for using audio via phone, room audio or no audio "don't use audio." These options are provided as a HH user may wish to use audio, but a deaf user may wish to turn off all audio during the meeting.

If the user logging into the meeting is an interpreter and the primary user associated with the interpreter has not yet joined the meeting, a notification is displayed on the screen stating that the primary user has not yet joined. In some examples, the interpreter cannot join the secondary stage concurrent call until the primary user has joined. In one example, the notification states "your pop out audio will not be enabled in the meeting call because your collaborator is unavailable." In other examples, the interpreter's POV looks similar to the primary users' POV without a speaker attribution button in the secondary stage settings.

However, the examples are not limited to only allowing an interpreter or other support provider to join after the primary user has joined. For example, if the primary user wants the support provider (interpreter) to attend/record a meeting the primary user cannot attend, the primary user can grant permissions to the support providers to attend the meeting and record themselves. Interpreters or other support providers are "invisible" to the main meeting attendees.

In other examples, the support providers are not prevented from joining the call until the primary user has joined. In these examples, the secondary stage is always available for designated support providers.

Figure 7:
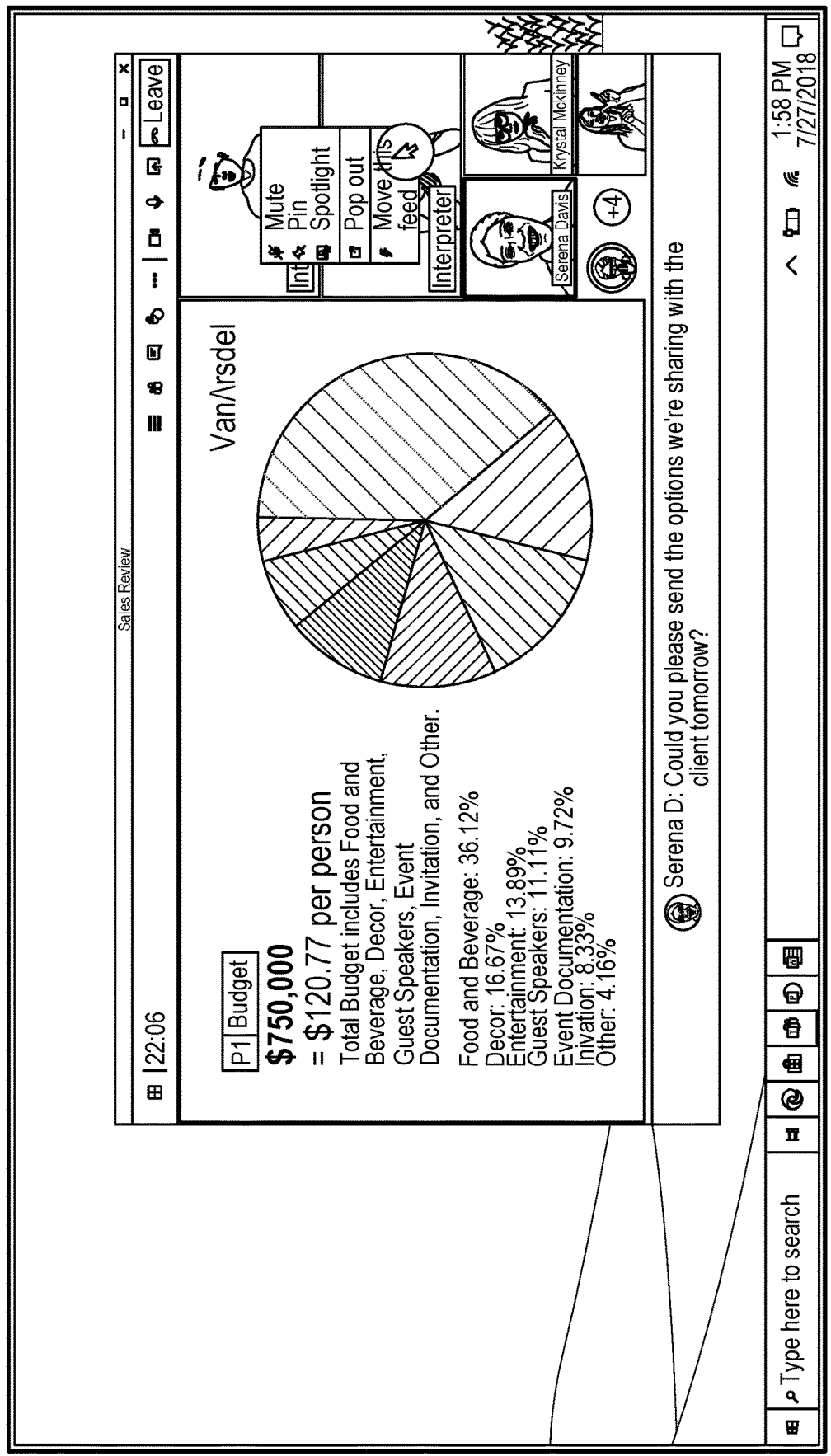
FIG. 7 is an exemplary screenshot illustrating an initial screen after the user joins the meeting.

FIG. 7 is an exemplary screenshot 700 illustrating an initial screen after the user joins the meeting. A pop out menu is shown to add a user to the secondary stage. The pop out indicates the video feed can be popped out to the secondary stage.

In this example, when the user joins the meeting, the interpreters windows are automatically first in view by default because the user already added the interpreters to the configurable settings. The user setting up the configurable settings and utilizing one or more translators/interpreters or other support provider may be referred to as a primary user. In the settings, the captions are set to turn on automatically at the beginning of every meeting. In this manner, the settings allow for quicker setup of meeting configuration options.

In this example, the captions are already on and presented to the user at the bottom of the primary stage. The location of the captions is user-configurable. The user can change the location of the captions to the top of the primary stage, the bottom of the secondary stage, or any other location desired by the user. In some examples, the user can move the captions window by dragging the window and dropping it into the new desired location on either the primary stage or the secondary stage.

In this example, the user right-clicks on the first interpreter's video feed to pop out the video into a separate frame, such as the secondary stage. The secondary stage provides second screen to display/view the interpreters in a larger window and/or a better video quality. The secondary stage may also be used to provide a more preferable position/location for the interpreters video feed where the user can more easily view the interpreters hands and other movements more clearly than if the interpreter was limited to the smaller window on the main stage which may be crowded with the video feed of a large number of other meeting attendees.

Figure 8:
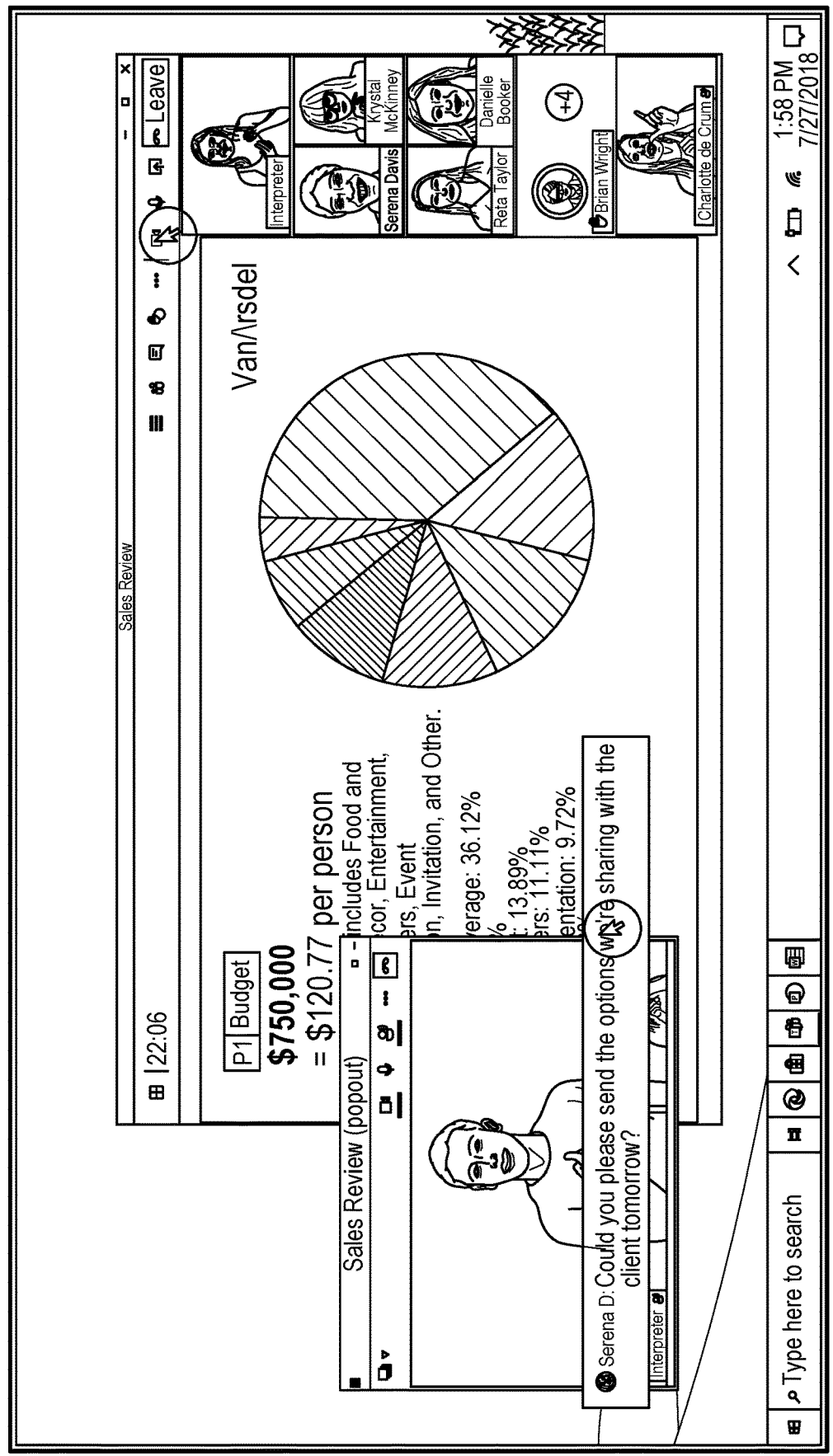
FIG. 8 is an exemplary screenshot illustrating a secondary stage overlaid on a portion of the primary stage.

FIG. 8 is an exemplary screenshot 800 illustrating a secondary stage overlaid on a portion of the primary stage. The pop-out secondary stage containing the video feed of the selected interpreter appears and includes a view of the interpreter with a small view of the user in the bottom right corner. The secondary stage provides a separate concurrent call with the ability to have separate audio and video feeds if the users want for more fine control and flexibility. A male interpreter is speaking on behalf of the primary user, in this example.

The captions are flexible and can be moved anywhere. In this example, the user has moved the captions from out of the main stage and placed it over the secondary stage. The captions are hovering over the secondary stage as a separate window. In other examples, the captions can be placed in the primary stage meeting window or placed in a standalone independent window separate from both the primary stage and the secondary stage, as shown in FIG. 8. In other examples, the captions can be placed in the secondary stage pop-out window, as shown in FIG. 9 below.

The captions in this example are movable. A user can drag and drop the captions window onto the secondary stage. The captions window can also be moved to any other location within or outside the secondary stage, providing increased flexibility for the user to configure the layout of the secondary stage and captions for improved viewing and visibility of the captions.

Figure 9:
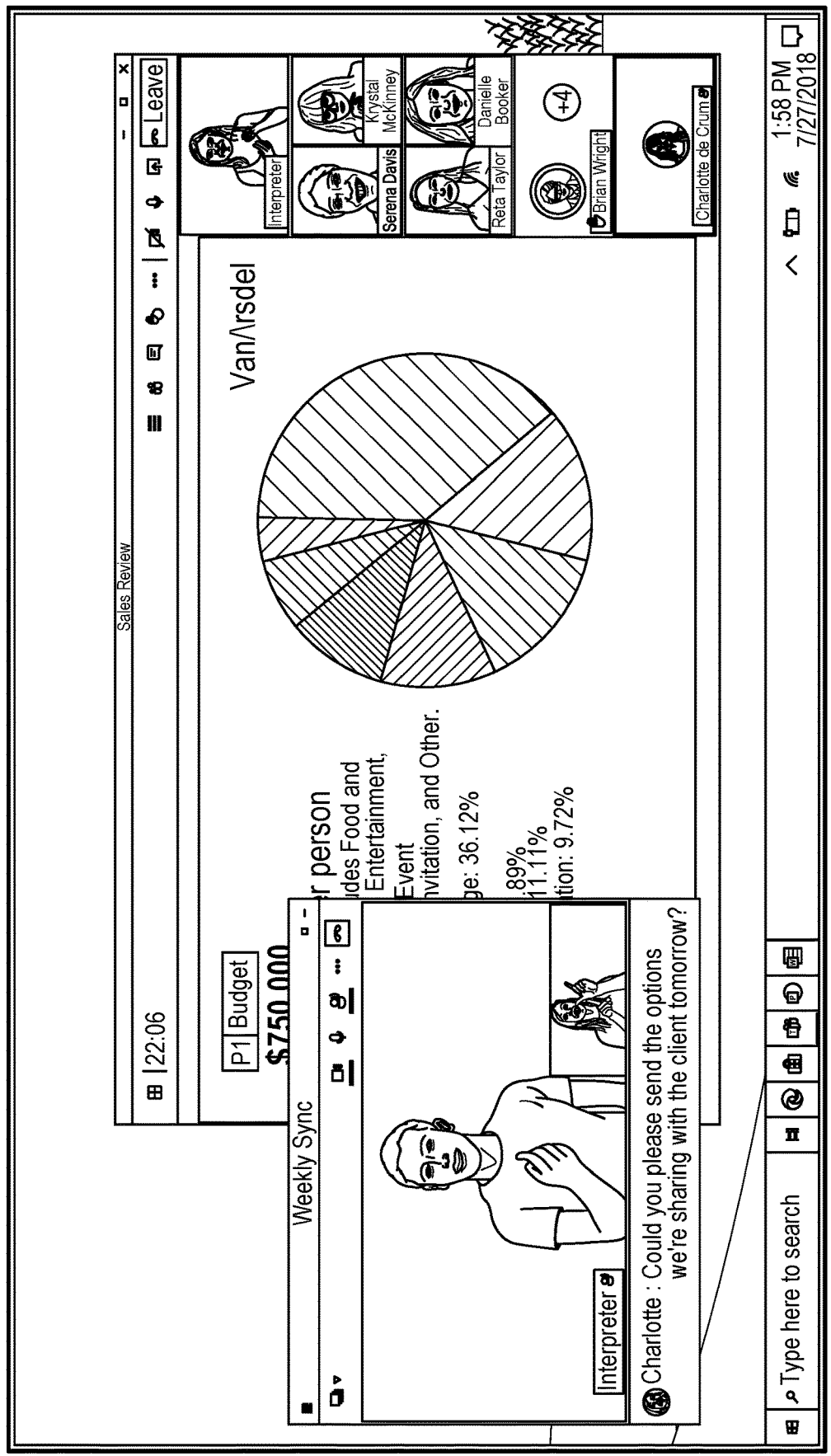
FIG. 9 is an exemplary screenshot illustrating captions in the secondary stage.

FIG. 9 is an exemplary screenshot 900 illustrating captions in the secondary stage. In this example, the user has snapped the captions window into the secondary stage such that the captions are not tethered to the secondary stage. If the secondary stage is moved, the captions window moves with the secondary stage. The user can optionally drag the captions window out of the secondary stage and return it to the primary stage or place it in a location outside both the primary stage and the secondary stage.

Figure 10:
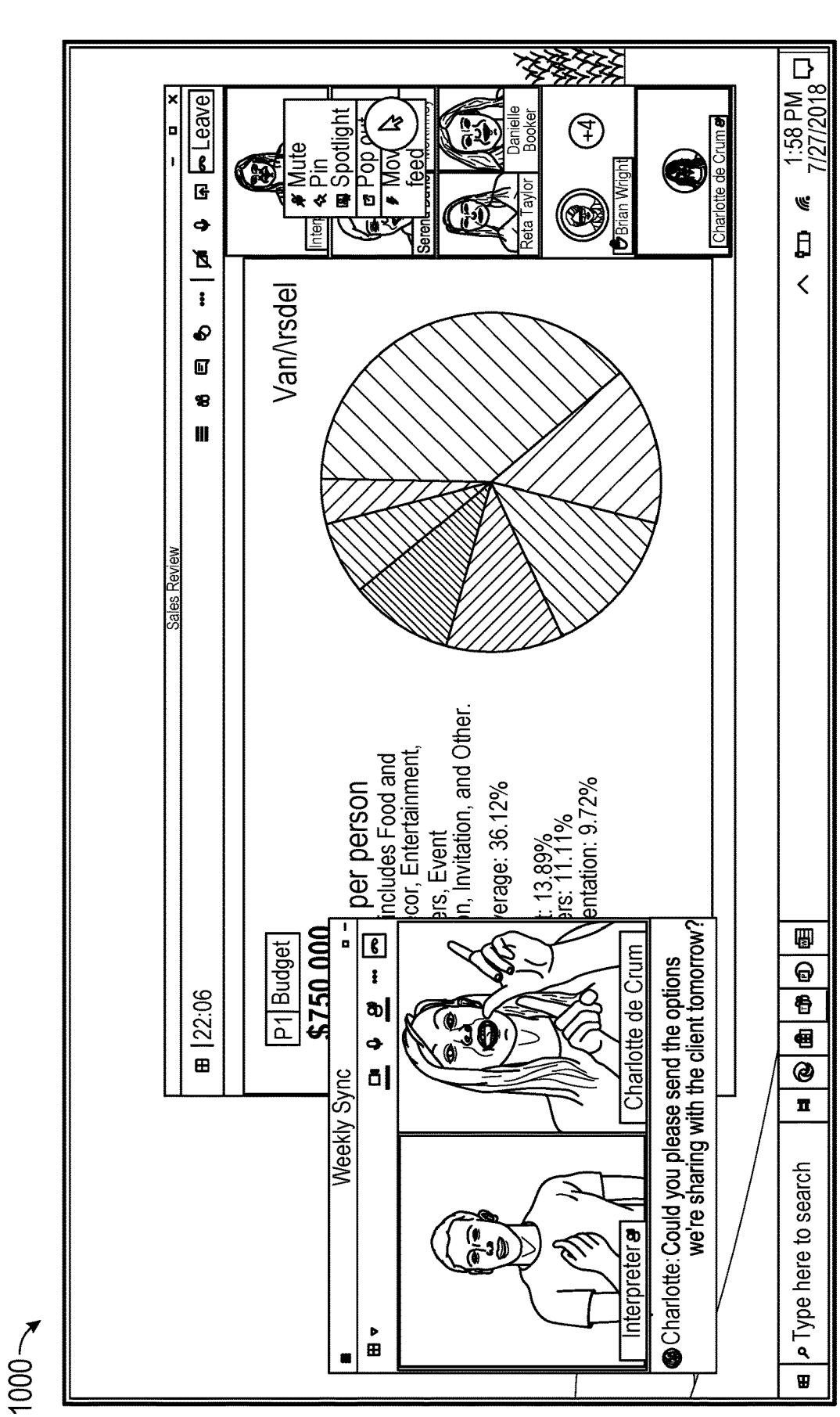
FIG. 10 is an exemplary screenshot illustrating two video feeds displayed within the secondary stage.

FIG. 10 is an exemplary screenshot 1000 illustrating two video feeds displayed within the secondary stage. In this example, the user has changed the layout of the secondary stage to show the interpreter on the left side of the secondary stage and the primary user's video feed is shown in the right side of the secondary stage. The primary user's video feed is now larger instead of a picture in picture feed as was shown in FIG. 9 above.

The primary stage and the secondary stage have separate camera controls permitting the user to selectively enable or disable the camera view of the user in the primary stage and the secondary stage. In other words, the camera can be on in both the primary and secondary state. The camera can be on in the primary stage and off in the secondary stage. Likewise, the camera can be on for the secondary stage and off in the primary stage.

In this example, speaker attribution is also shown. More specifically, the interpreter is speaking (far left), and the attribution is to the deaf/HH user shown at bottom right. The primary user has turned the camera off in the primary stage and has the camera turned on in the secondary stage.

In this example, the two video feeds shown in the secondary stage are arranged side-by-side. In other examples, the video feeds are arranged in a top down or stacked configuration. As the interpreter speaks for the primary user that is signing, the speaker attribution identifies the primary user as the speaker so that the words spoken by the interpreter are correctly attributed to the primary user.

The secondary stage pop out window in this example is located at the bottom left side of the user interface. In other examples, the pop out window can be placed in the upper right-hand corner, the bottom right-hand side, or any other location within the user interface.

Figure 11:
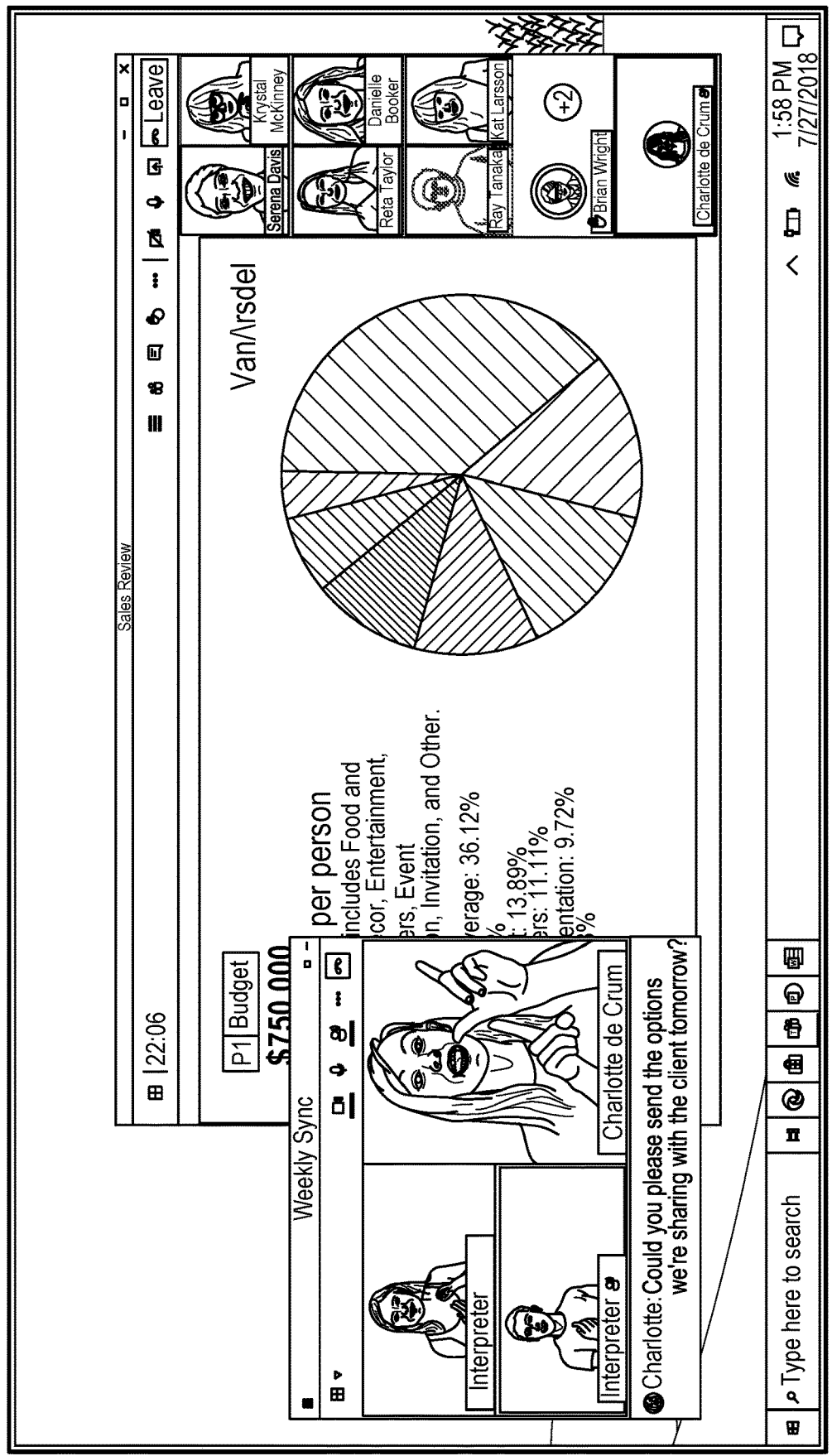
FIG. 11 is an exemplary screenshot illustrating three video feeds displayed within the secondary stage.

Turning now to FIG. 11, an exemplary screenshot 1100 illustrating three video feeds displayed within the secondary stage is shown. The user right-clicks on the video feed of the second interpreter within the primary stage to add the second interpreter's video feed to the secondary stage. The second interpreter is part of the concurrent call between the primary user and the first interpreter. The windows in this view can easily be rearranged to the user's preferences.

This allows flexibility for users who have different preferences, just like in-person meetings. The software does all of the heavy lifting in setting things up, from the secondary stage pop out window to ensuring the right people are mapped together, based on their designated roles in settings.

Figure 12:
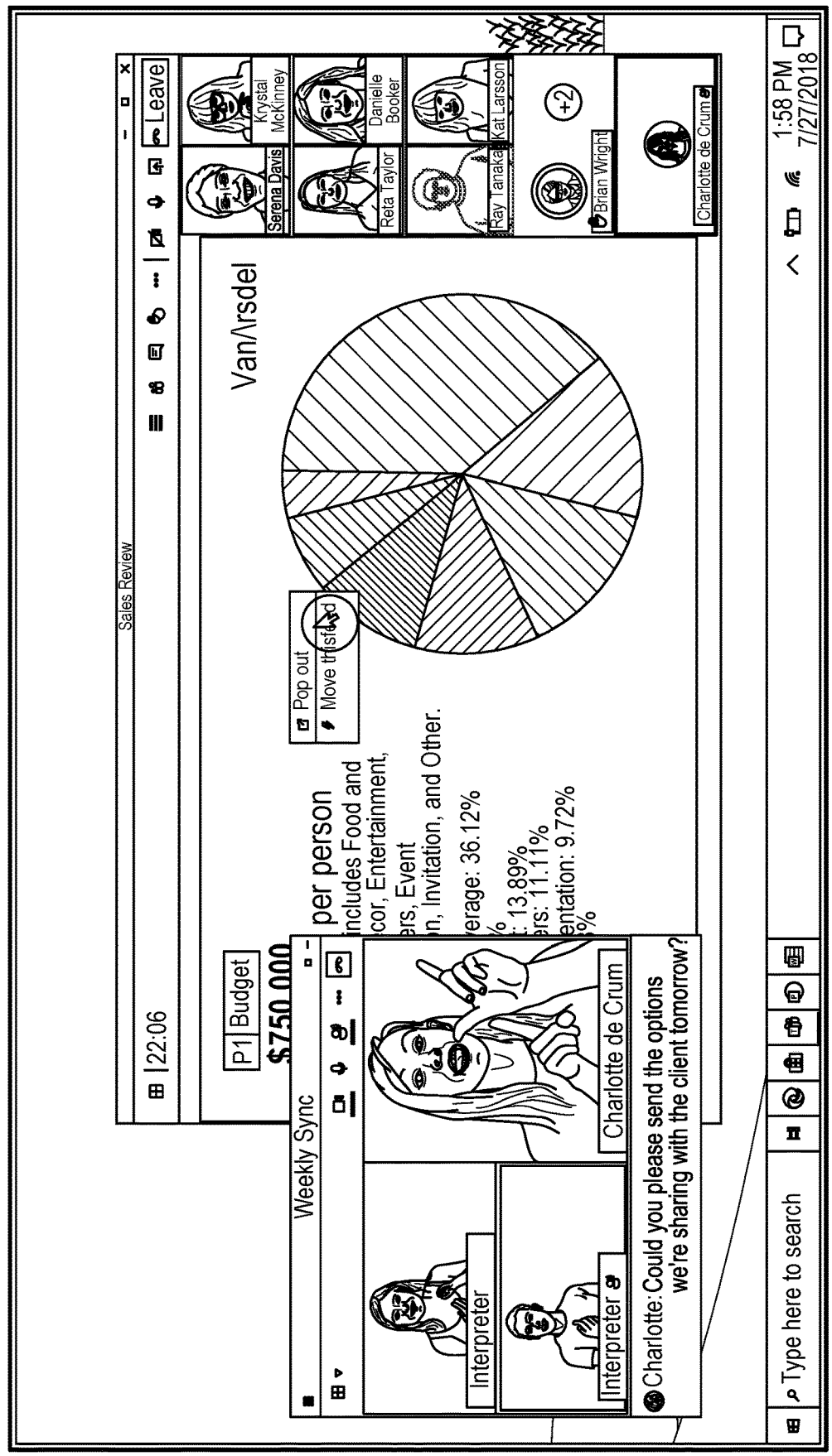
FIG. 12 is an exemplary screenshot illustrating a pop out menu for activating the secondary stage.

FIG. 12 is an exemplary screenshot illustrating a pop out menu for activating the secondary stage. Hearing users are able to minimize a video conferencing application to multitask while continuing to listen to audio of the meeting. However, a deaf or HH person is unable to do so. By activating the pop out window, the secondary stage pop out window remains overlaid on top of any content displayed on the user interface even if the user minimizes the primary stage. The user can choose to always have the secondary stage pop out window on top as a setting. This pop out setting can be turned on or off to enable multitasking during meetings.

Figure 13:
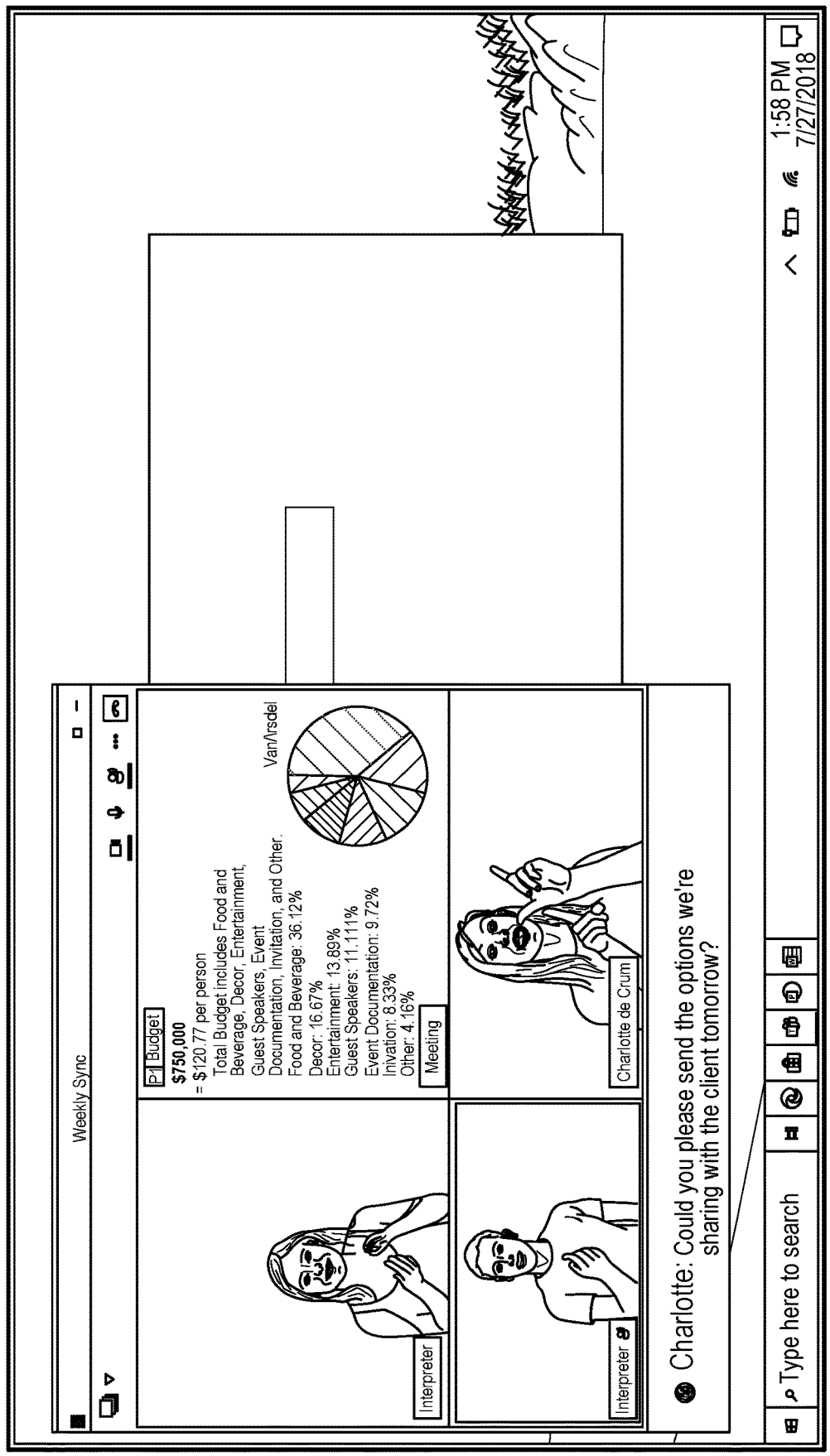
FIG. 13 is an exemplary screenshot illustrating a secondary stage pop out window display persisting while the primary stage window is minimized.

FIG. 13 is an exemplary screenshot illustrating a secondary stage pop out window display persisting while the primary stage window is minimized. The primary stage meeting window is hidden. The meeting shared content feed appears in the pop out window along with the two selected interpreters. The user is able to check email, utilize a web browser or perform other tasks on the desktop while remaining be an active participant in the current meeting.

The screenshots shown in FIG. 6-FIG. 8 are mainly from a deaf users' point-of-view (POV). An Interpreter's POV is just as important as the deaf users' POV. The secondary stage view is similar to the primary users' POV. In some examples, the interpreter can join meetings early without alerting anyone to test their video and audio. The concurrent call audio will not be allowed to be injected into the meeting audio if a participant starts a meeting because they are not the actual participant. The interpreters are supporting another primary user (deaf or HH user). Therefore, the system does not admit the interpreters in the meeting without the primary user's approval. When the primary user joins the meeting, the accessibility manager software recognizes that and maps the one or more interpreters and the primary user to the same concurrent (pop out) call associated with the secondary stage. In other examples, the pre-meeting flow optionally additionally shows which video feed will have captions applied (if any).

There are various ways in which meeting attendees can be automatically notified that one or more interpreters are participating in meetings on behalf of another meeting participant. In one example, the meeting notification in a user's calendar can include a notification in the meeting header and/or the meeting description or other notes that a participant requested the meeting to be transcribed. In other examples, the notification or alert banner can include an indication that an attendee requests other users have videos turned on during the meeting. In still other examples, the notification can call out the anticipated presence of one or more interpreters participating in the meeting.

Figure 14:
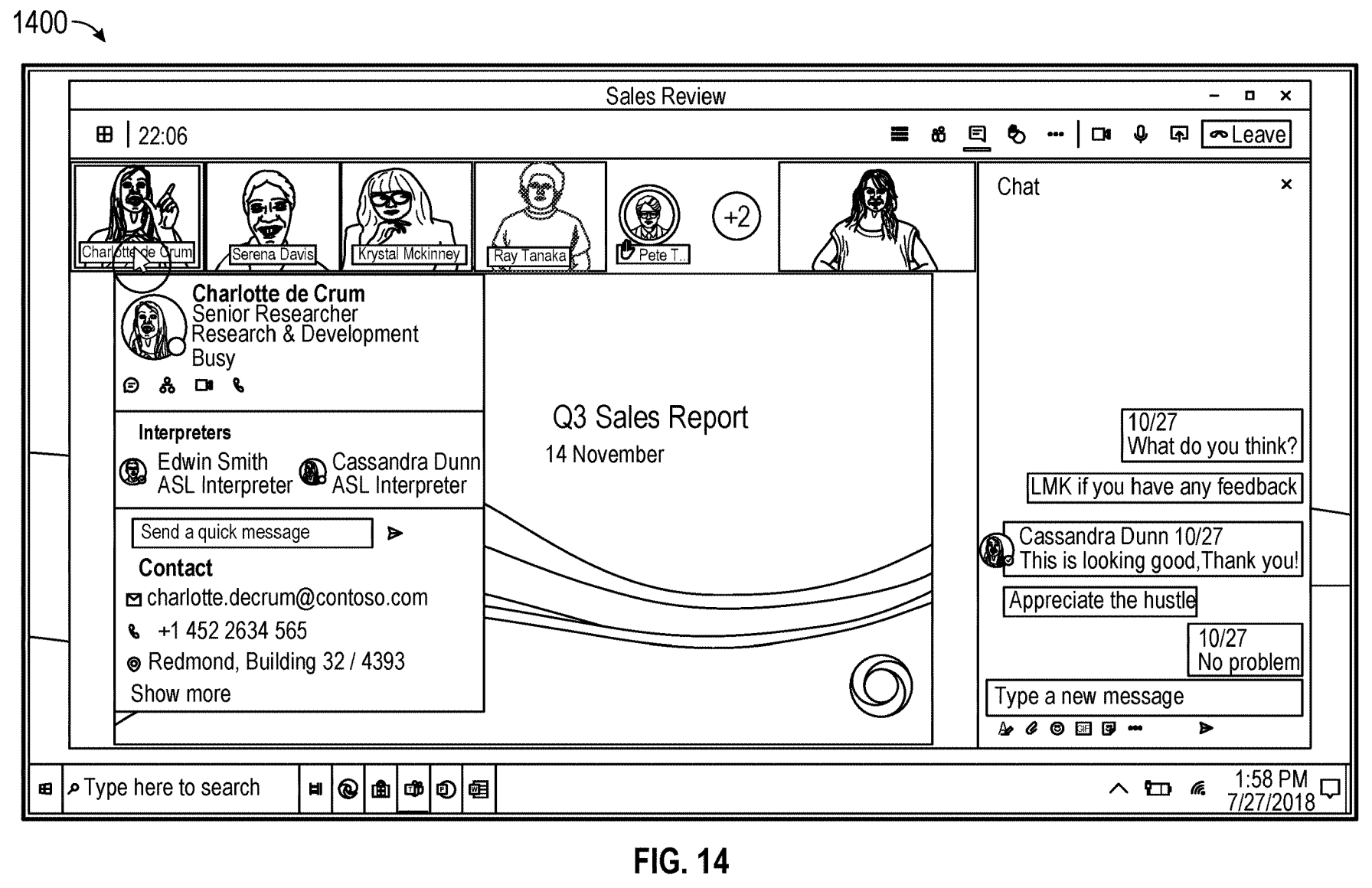

FIG. 14 is an exemplary screenshot 1400 illustrating an active speaker attribution associated with a primary user while an interpreter is speaking on behalf of the primary user. In some examples, while the primary user is signing, an active speaker halo animates around the primary user even though the verbal speech is coming from the interpreter. The interpreters' audio is mapped to the primary (deaf or HH) user by the accessibility manager. In this example, a participant has selected to view the people card associated with the primary user. The card shows who is interpreting on behalf of the primary user. The user can optionally turn this feature off or on via the configurable settings. Speaker attribution is provided for the primary user whenever the interpreter speaks on behalf of the primary user.

Figure 15:
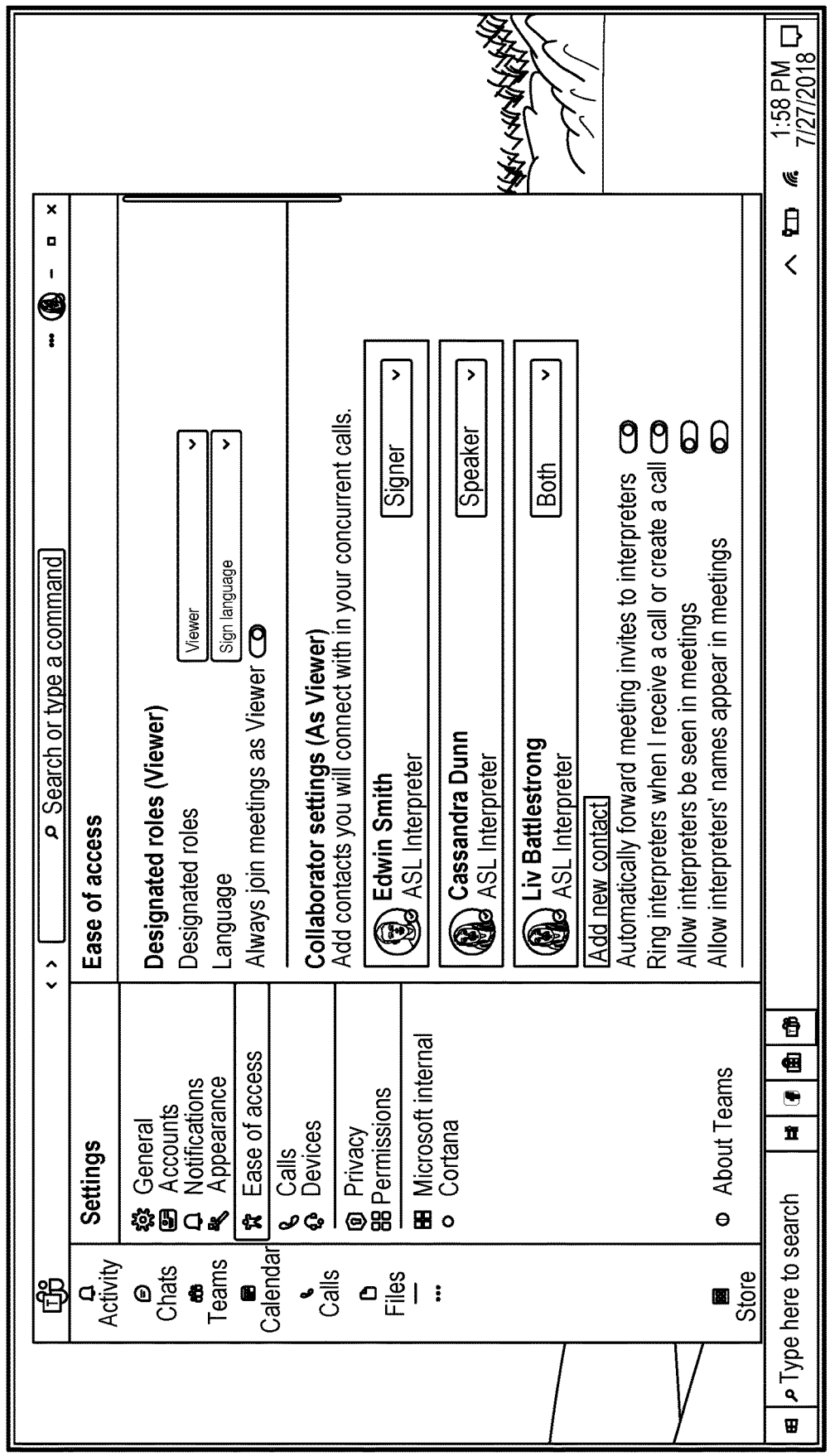
FIG. 15 is an exemplary screenshot illustrating a set of user-configurable settings.

FIG. 15 is an exemplary screenshot 1500 illustrating a set of user-configurable settings. The configurable settings enable the accessibility manager to streamline experiences for various type of users, including users that are deaf or HH. In this example, the user indicates sign language as their native language. The user can add or remove preferred interpreters. Having a list of contacts has several benefits. Meeting invites can automatically be forwarded to interpreters. The system can call interpreters when the user receives a call or creates a call, enabling the interpreters to join the call more quickly and efficiently. The settings further allow interpreters to be seen in meetings or remain hidden. This enables users to choose whether to visibly show their interpreter in the meeting attendee roster with the interpreters' names, while other users can choose to leave the interpreters names off the roster.

Interpreters optionally have their own settings. The interpreters can designate their language as sign language here too. If two designated roles have the same categories (basically sign language)—they can be automatically connected to concurrent calls in pop out windows. This makes it easier for everyone involved. The system can optionally provide other features to interpreters, such as interpreter option to receive calendar invites from their clients.

In other examples, the settings include user-configurable audio settings. The audio settings allow flexibility to map different audio to different devices. The primary user and/or interpreters associated with the primary user can adjust volume settings to their liking.

Figure 16:
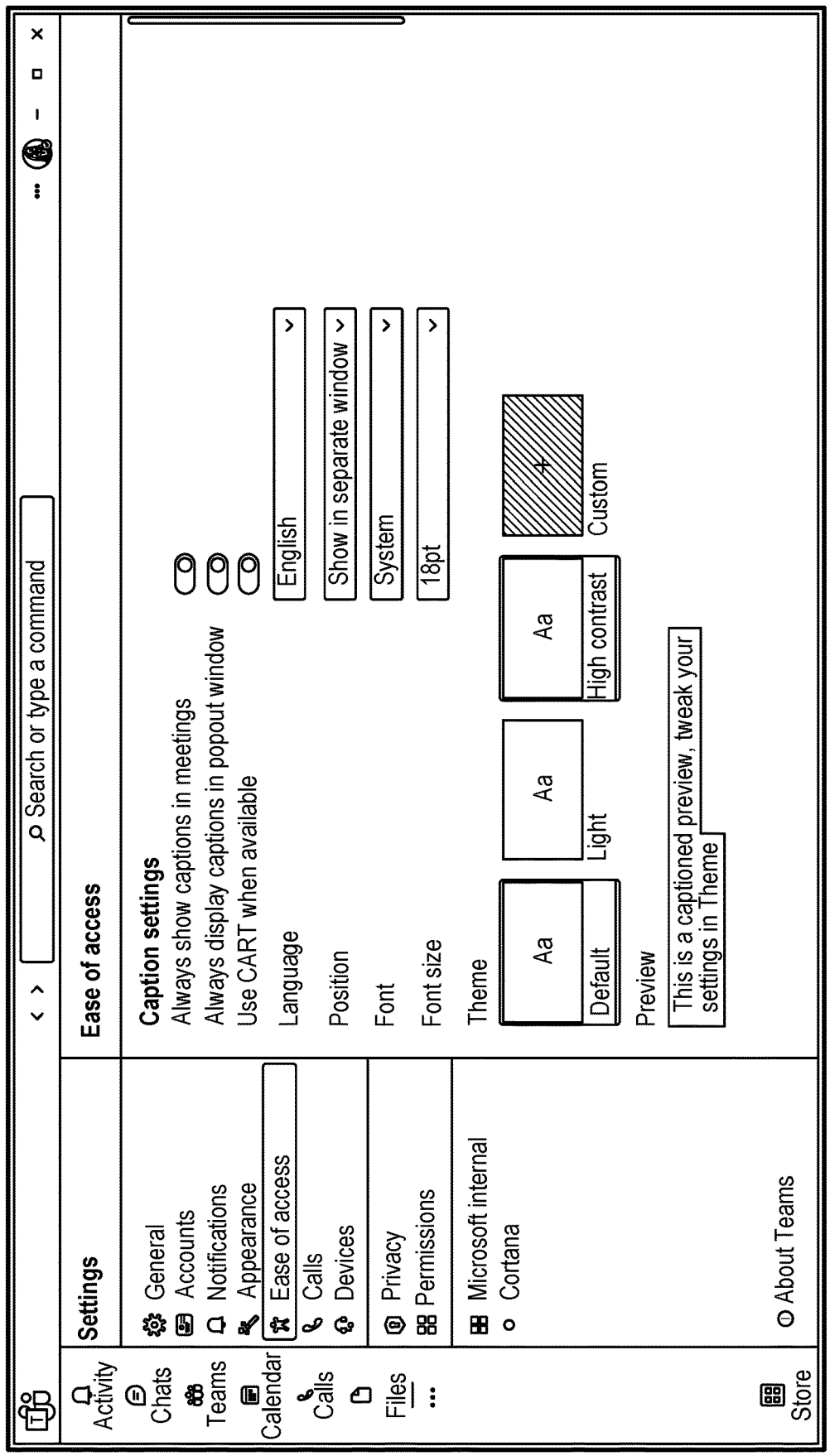
FIG. 16 is an exemplary screenshot illustrating a set of user-configurable captions settings.

Referring now to FIG. 16, an exemplary screenshot illustrating a set of user-configurable captions settings is depicted. The settings permit captions to be automatically turned on at the start of every meeting.

For example, communication access real-time translation (CART) is a service provided by a captioner who types in real time instead of using artificial intelligence to transcribe the audio. Captioners usually work large events for accuracy, and the setting for "Use CART" when available allows the user to choose that service instead of relying on artificial intelligence (AI) captioning that is not always accurate. Other settings optionally include tweaking the theme of captions, font, position, and etc.

Figure 17:
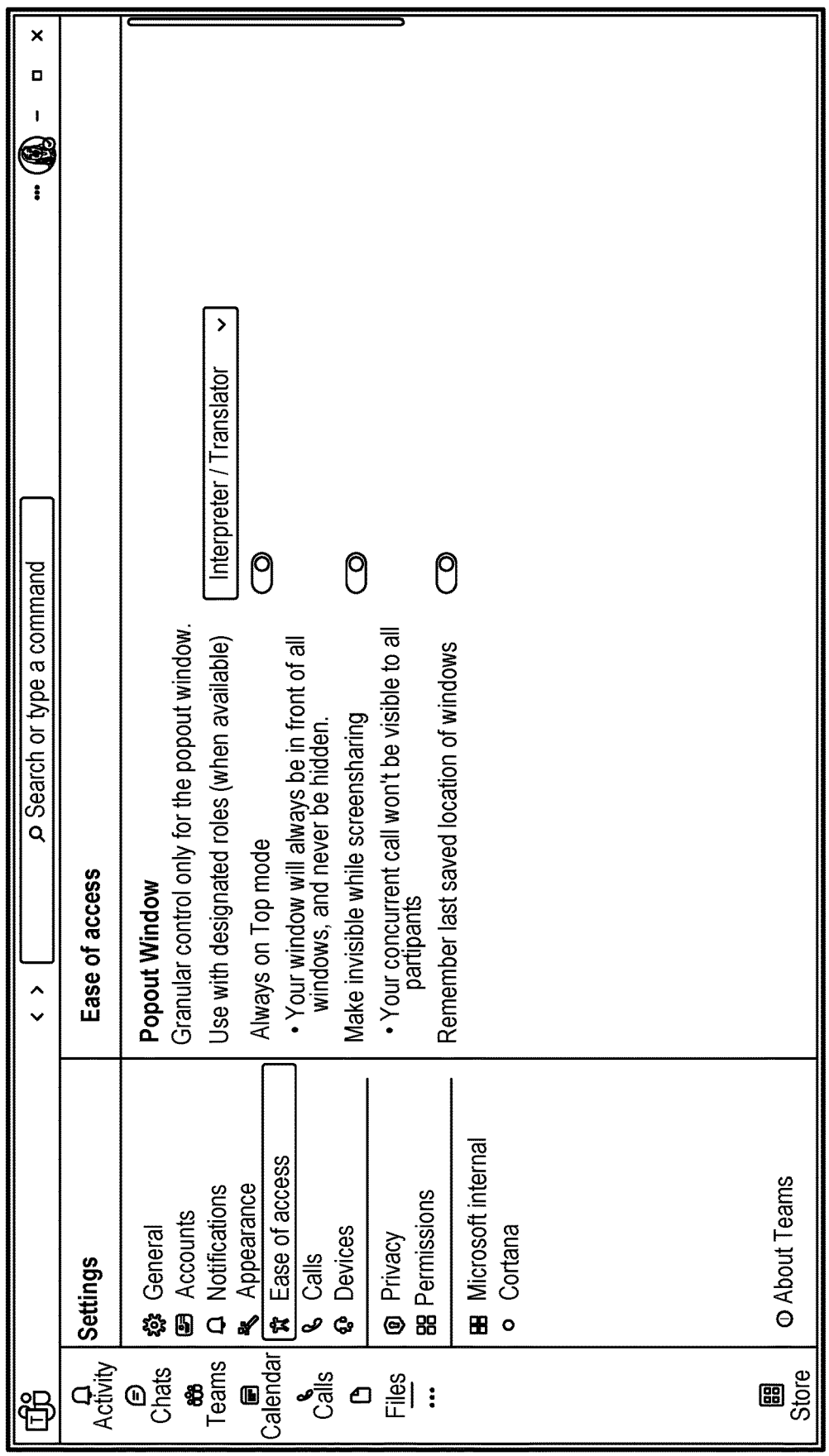
FIG. 17 is an exemplary screenshot illustrating user-configurable secondary stage settings.

FIG. 17 is an exemplary screenshot 1700 illustrating user-configurable secondary stage settings. The settings permit the user to assign interpreters, specify whether the secondary stage should always be displayed on top mode, whether the secondary stage should be invisible while screensharing, etc. The settings permit streamlining of the meeting experience for accessibility users. The system further provides users with flexibility in arranging the primary stage window and the secondary stage window.

Figure 18:
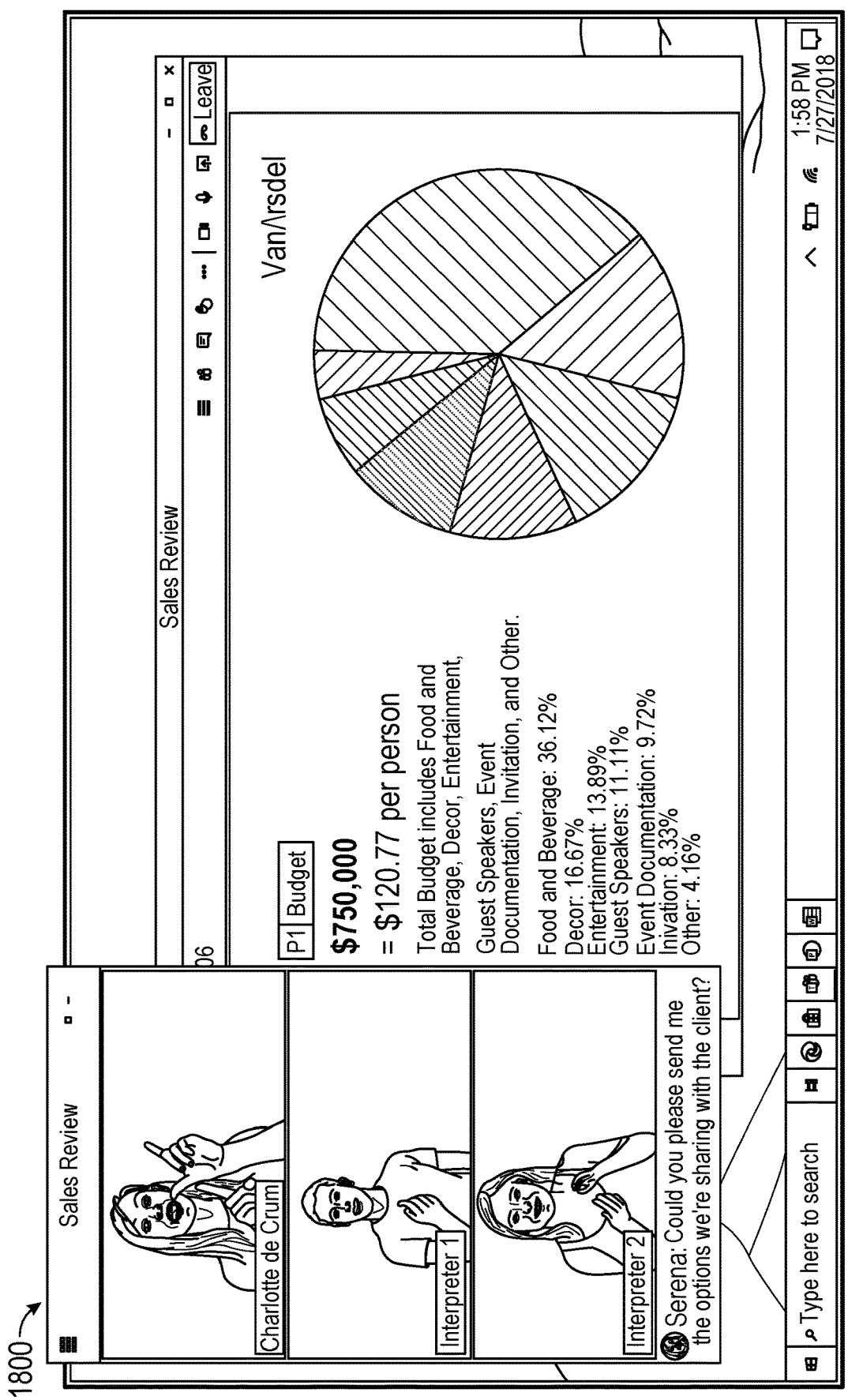
FIG. 18 is an exemplary screenshot illustrating user-configurable video feeds within a secondary stage pop out window.

FIG. 18 is an exemplary screenshot 1800 illustrating user-configurable video feeds within a secondary stage pop out window. The video feeds associated with the interpreters and the primary user in this example are stacked in a vertical configuration. However, in other examples, the video feeds can be arranged horizontally in a side-by-side arrangement or any other configuration.

Additional Examples

In some examples, only the active interpreter is displayed on the primary stage and the secondary stage. Instead of allocating valuable real-estate to a supporting interpreter, a single slot is provided that allows interpreters to determine which interpreter has an active role indicating the interpreter's video feed should be visible to the primary user. This view is accessible to users via a stage option. In this manner, the user is not dependent upon the meeting organizer to put the primary interpreter within a video feed that is visible to the user. Instead, the accessibility manager automatically provides the secondary stage pop out window for presentation of the primary interpreter video feed to the user regardless of whether the interpreter is visible on the primary (main) stage. Moreover, the secondary stage includes a separate record function which permits the user and/or the support providers (interpreters) to record the primary interpreter feed on the secondary stage. This provides the user with the ability to play back the meeting via the secondary stage recording of the signing interpreter in situations in which the primary interpreter video feed in the main stage is too small or obscured to be of practical assistance to the user.

The recording is a separate feed that can be played on its own. The recording can also be toggled in picture-in-picture during recording playback.

In other examples, the accessibility manager provides a private back-channel for communications between the interpreters and/or communications between the primary user and the interpreters. The back-channel allows users tethered to the secondary state to support each other without interrupting the natural flow of the main meeting. The D/HH participant often has the most context and can also feed information and corrections to the interpreter(s). All of this contributes towards improving the quality of (future) interpretation.

The configurable user settings are global settings in some examples. To reduce cognitive load and avoid repetitive setup tasks, the user settings are centralized settings which are set once by the user and remain in place until the user makes a change. The customization of captions (including making them sticky) and the transcript view are configurable on a global level and applied across all the user's meetings. Interpreters, CART writers, notetakers, and other types of personal assistants are configurable and follow the primary user. This helps drive scheduling and tethering scenarios.

In other examples, users can specify third-party interpreting services to use. The user can specify the appropriate aspect ratio for their videos and have this respected wherever displayed. For example, a deaf/HH person or interpreter can specify that their videos should be optimized for signing. Always at high quality and always at a 16:9 ratio regardless of the state they are in on the stage (pinned, spotlighted, et al).

The settings, in still other examples, includes an alternative reduced motion setting that does not overlay interpreters' screen as it may block interpretation. Emojis can be static, not shown at all and/or only displayed on the primary stage.

In some examples, a pre-join workflow provided by the accessibility manager presents an opportunity for users to ensure that everything is in place prior to joining the meeting. Collectively, the pre-join workflow applying the user-configured settings significantly cut down on (and even eliminate) the amount of setup required for the primary user and their interpreters to get themselves situated for meetings. For example, captions can be turned on and configured from the pre-join screen. This enables captions to be available as soon as the meeting audio starts up. As with captions, if desired, meetings can be set up to start with transcription enabled and the transcript view immediately displayed. Meeting organizers can automatically start transcription in the same way they have the option to start recording automatically.

The user can create, choose, or configure the appropriate layout based on the meeting that is being attended prior to joining the meeting, in other examples. This could mean having a view dedicated to the active speaker with captions positioned directly below or their interpreters being pinned in the desired location(s). The layout includes establishing a group of participants that are to be kept together (tethered) throughout the entire meeting experience. In this manner, no additional setup is required after entering the meeting.

Some examples provide a system for providing a floating secondary stage during video conferencing meetings. The system includes a set of user-configurable settings created by a primary user. The settings are applied to generate secondary stage content customized for a specific user. A floating secondary stage is provided during a video conferencing meeting concurrently with a primary stage associated with the video conferencing meeting. The primary stage includes a plurality of video feeds associated with a plurality of meeting attendees. The primary user is one of the meeting attendees in the plurality of meeting attendees. The display of the floating secondary stage persists on a user interface device within a user-selected location even when the primary stage is minimized. The video quality of a video feed associated with a first meeting attendee within the secondary stage is prioritized over a video feed associated with a second meeting attendee within the primary stage.

Other examples provide a method for a floating secondary stage during video conferencing meetings. A set of user-configurable settings are generated by a primary user. The settings are applied to generate secondary stage content presented within a floating secondary stage during a video conferencing meeting. The floating secondary stage and a primary stage associated with the video conferencing meeting are generated. The primary stage includes a plurality of video feeds associated with a plurality of meeting attendees. The secondary stage persists on a user interface device within a user-selected location regardless of whether the primary stage is minimized or not. The secondary stage is always on top of any application, regardless of the scenario providing the user with constant access to content in the secondary stage.

In other examples, a video feed associated with at least one interpreter or other support service providers and selected content is visible within the floating secondary stage on the user interface for the duration of the video conferencing meeting. The support service providers can include language translators for users speaking different languages, descriptive services for the blind, or any other support provider, enabling continual and reliable access to these interpreters and service providers during meetings.

A private side channel is provided in other examples via the secondary stage. The side channel can provide private communications between a user and one or more interpreters, the user and one or more note takers, a user and an assistant, or any other scenario. This enables the user to communicate without interrupting the primary meeting via the side channel without requiring a secondary computing device for improved user experience.

Still other examples provide a computer readable storage device having computer-executable instructions for a floating secondary stage during video conferencing meetings. A set of user-configurable settings generated by the user are applied to generate a primary stage and a floating secondary stage during a video conferencing meeting. The floating secondary stage includes configurable content with content settings customizable by each user, including but not limited to, active speaker attribution. The active speaker attribution is provided for the primary user when a designated interpreter speaks during the video conferencing meeting on behalf of the primary user, giving the primary user appropriate attribution during meetings.

Alternatively, or in addition to the other examples described herein, examples include any combination of the following:
- apply a set of user-configurable settings associated with secondary stage content presented within a floating secondary stage during a video conferencing meeting, the set of user-configurable settings generated by a primary user;
- display the floating secondary stage and a primary stage associated with the video conferencing meeting, the primary stage comprising a plurality of video feeds associated with a plurality of meeting attendees;
- persist display of the floating secondary stage on a user interface device within a user-selected location while the primary stage is minimized;
- prioritize a video quality of secondary stage content within the floating secondary stage, wherein a quality of a video feed associated with a designated higher priority meeting attendee designated as an interpreter within the floating secondary stage is given a higher priority than a quality of a video feed associated with an undesignated meeting attendee within the plurality of video feeds associated with the plurality of meeting attendees displayed on the primary stage;
- tether a primary interpreter video feed and a secondary interpreter video feed to the floating secondary stage via the set of user-configurable settings, wherein the primary interpreter video feed and the secondary interpreter video feed are displayed within the floating secondary stage;
- tether a first user and a second user to the primary user;
- automatically send a meeting invitation to the tethered first user and the tethered second user if a meeting invitation is sent to the primary user;
- tether an interpreter to the primary user;
- provide an active speaker attribution for the primary user within the primary stage when the interpreter speaks during the video conferencing meeting on behalf of the primary user;
- automatically activate captions in accordance with the configurable settings at a beginning of every meeting, wherein the captions are displayed within a pre-configured location within the floating secondary stage;
- automatically activate a transcript service in accordance with the configurable settings at a beginning of every meeting, wherein a generated transcript is displayed within a pre-configured location within the floating secondary stage;
- enable a private communication channel between the primary user and an interpreter within the floating secondary stage, wherein a conversation between the primary user and the interpreter occurring during the video conferencing meeting is unavailable to the plurality of meeting attendees interacting via the primary stage;
- enabling a higher aspect ratio for a first video feed within the floating secondary stage and a lower aspect ratio for a second video feed within the floating secondary stage
- assign an interpreter role to a meeting attendee within the primary stage via the configurable settings;
- persisting a display of the floating secondary stage on a user interface device within a user-selected location while the primary stage is minimized, wherein a video feed associated with at least one interpreter and selected content is visible within the floating secondary stage on the user interface for the duration of the video conferencing meeting;
- maintaining a first video feed displayed within the floating secondary stage associated with a first meeting attendee designated as a primary interpreter at a higher priority than a quality of a second video feed associated with a meeting attendee within the plurality of meeting attendees;
- providing an active speaker attribution for the primary user within the primary stage when a designated interpreter speaks during the video conferencing meeting on behalf of the primary user;
- prioritize a video quality of secondary stage content within the floating secondary stage, wherein a quality of a video feed associated with a first meeting attendee designated as an interpreter within the floating secondary stage is given a higher priority than a quality of a video feed associated with a second meeting attendee within the plurality of video feeds associated with the plurality of meeting attendees displayed on the primary stage.

Figure 19:
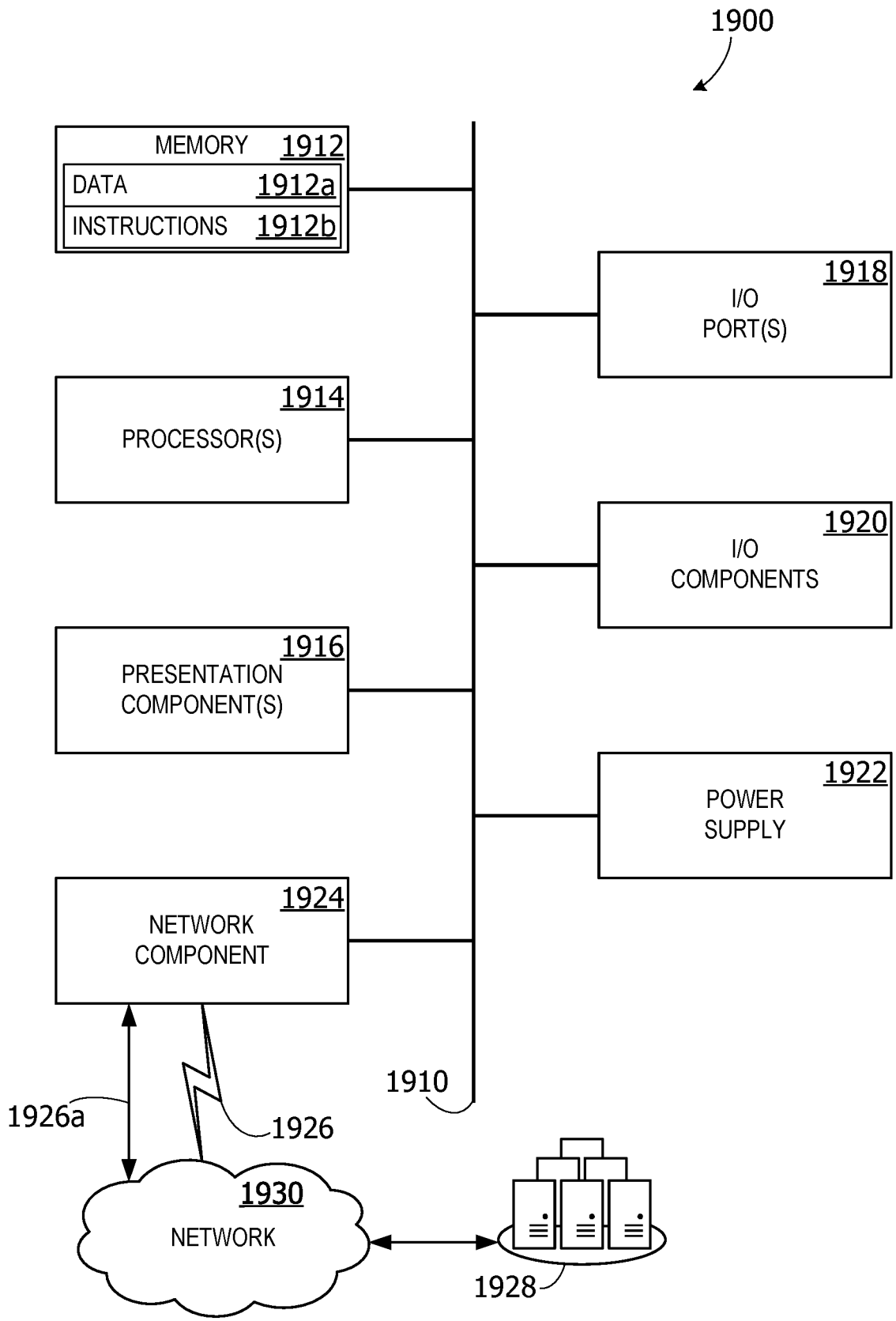
FIG. 19 is a block diagram of an example computing device for implementing aspects disclosed herein and is designated as computing device.

At least a portion of the functionality of the various elements in FIG. 1, FIG. 2 and FIG. 19 can be performed by other elements in FIG. 1, FIG. 2 and FIG. 19, or an entity (e.g., processor 106, web service, server, application program, computing device, etc.) not shown in FIG. 1, FIG. 2 and/or FIG. 19.

In some examples, the operations illustrated in FIG. 3, FIG. 4 and FIG. 5 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of providing a floating accessibility stage, the method comprising applying a set of user-configurable settings associated with secondary stage content presented within a floating secondary stage during a video conferencing meeting, the set of user-configurable settings generated by a primary user; displaying the floating secondary stage and a primary stage associated with the video conferencing meeting, the primary stage comprising a plurality of video feeds associated with a plurality of meeting attendees; and persisting a display of the floating secondary stage on a user interface device within a user-selected location while the primary stage is minimized, wherein a video feed associated with at least one interpreter and selected content is visible within the floating secondary stage on the user interface for the duration of the video conferencing meeting.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Example Operating Environment

FIG. 19 is a block diagram of an example computing device 1900 for implementing aspects disclosed herein and is designated as computing device 1900. The computing device 1900 is a computing device, such as the computing device 102 in FIG. 1. The computing device 1900 is an example of a suitable computing environment and is not intended to suggest any limitation as to the scope of use or functionality of the examples disclosed herein. Neither should computing device 1900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1900 includes a bus 1910 that directly or indirectly couples the following devices: computer-storage memory 1912, one or more processors 1914, one or more presentation components 1916, I/O ports 1918, I/O components 1920, a power supply 1922, and a network component 1924. While computing device 1900 is depicted as a single device, multiple computing devices 1900 may work together and share the depicted device resources. For example, memory 1912 may be distributed across multiple devices, and processor(s) 1914 may be housed with different devices.

Bus 1910 represents what may be one or more busses (such as an address bus, data bus, or a combination thereof). Although the various blocks of FIG. 19 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 19 and the references herein to a "computing device."

Memory 1912 may take the form of the computer-storage media references below and operatively provide storage of computer-readable instructions, data structures, program modules and other data for computing device 1900. In some examples, memory 1912 stores one or more of an operating system, a universal application platform, or other program modules and program data. Memory 1912 is thus able to store and access data 1912a and instructions 1912b that are executable by processor 1914 and configured to carry out the various operations disclosed herein.

In some examples, memory 1912 includes computer-storage media in the form of volatile and/or nonvolatile memory, removable or non-removable memory, data disks in virtual environments, or a combination thereof. Memory 1912 may include any quantity of memory associated with or accessible by computing device 1900. Memory 1912 may be internal to computing device 1900 (as shown in FIG. 19), external to computing device 1900 (not shown), or both (not shown).

Examples of memory 1912 in include, without limitation, RAM; read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1900. Additionally, or alternatively, memory 1912 may be distributed across multiple computing devices 1900, for example, in a virtualized environment in which instruction processing is carried out on multiple computing devices 1900. For the purposes of this disclosure, "computer storage media," "computer storage device," "computer-storage memory," "memory," and "memory devices" are synonymous terms for computer-storage memory 1912, and none of these terms include carrier waves or propagating signaling. In some examples, the memory 1912 is a memory such as, but not limited to, the memory 108 in FIG. 1.

Processor(s) 1914 may include any quantity of processing units that read data from various entities, such as memory 1912 or I/O components 1920 and may include CPUs and/or GPUs. Specifically, processor(s) 1914 are programmed to execute computer-executable instructions for implementing aspects of the disclosure. The instructions may be performed by the processor, by multiple processors within computing device 1900, or by a processor external to client computing device 1900. In some examples, processor(s) 1914 are programmed to execute instructions such as those illustrated in the in the accompanying drawings.

Moreover, in some examples, processor(s) 1914 represent an implementation of analog techniques to perform the operations described herein. For example, the operations may be performed by an analog client computing device 1900 and/or a digital client computing device 1900. In some examples, the processor(s) 1914 include one or more processors, such as but not limited to, the processor 106 in FIG. 1.

Presentation component(s) 1916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1900, across a wired connection, or in other ways. I/O ports 1918 allow computing device 1900 to be logically coupled to other devices including I/O components 1920, some of which may be built in. Example I/O components 1920 include, for example but without limitation, a microphone, joystick, game pad, satellite dish, scanner, printer, wireless device, etc.

Computing device 1900 may operate in a networked environment via network component 1924 using logical connections to one or more remote computers. In some examples, network component 1924 includes a network interface card and/or computer-executable instructions (e.g., a driver) for operating the network interface card. Communication between computing device 1900 and other devices may occur using any protocol or mechanism over any wired or wireless connection.

In some examples, network component 1924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1924 communicates over wireless communication link 1926 and/or a wired communication link 1926a to a cloud resource 1928 across network 1930. Various different examples of communication links 1926 and 1926a include a wireless connection, a wired connection, and/or a dedicated link, and in some examples, at least a portion is routed through the internet.

Although described in connection with an example computing device 1900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of," or "exactly one of" "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing a floating secondary stage during a video conferencing meeting, the system comprising:
   a processor; and
   a memory comprising computer-readable instructions, the processor, the memory and the computer-readable instructions configured to cause the processor to:
   generate the floating secondary stage and a primary stage associated with the video conferencing meeting, the primary stage comprising a plurality of video feeds associated with a plurality of meeting attendees;
   persist display of the floating secondary stage on a user interface device within a user-selected location while the primary stage is minimized;
   tether a support provider user to a primary user;
   provide an active speaker attribution for the primary user within the primary stage while the support provider user is speaking during the video conferencing meeting on behalf of the primary user; and
   prioritize a video quality of secondary stage content within the floating secondary stage, wherein a quality of a first video feed associated with a first meeting attendee designated as the support provider user within the floating secondary stage is given a higher priority than a quality of a second video feed associated with a second meeting attendee within the plurality of video feeds associated with the plurality of meeting attendees displayed on the primary stage.

2. The system of claim 1, wherein the memory and the computer-readable instructions are further configured to cause the processor to:
   tether a primary support provider video feed and a secondary support provider video feed to the floating secondary stage via a setting, wherein the primary support provider video feed and the secondary support provider video feed are displayed within the floating secondary stage.

3. The system of claim 1, wherein the memory and the computer-readable instructions are further configured to cause the processor to:
   tether a first user and a second user to the primary user; and
   automatically send a meeting invitation to the tethered first user and the tethered second user upon a meeting invitation being sent to the primary user.

4. The system of claim 1, wherein the memory and the computer-readable instructions are further configured to cause the processor to:
   automatically activate a caption in accordance with a setting at a beginning of every meeting, wherein the caption is displayed within a location within the floating secondary stage.

5. The system of claim 1, wherein the memory and the computer-readable instructions are further configured to cause the processor to:
   automatically activate a transcript service in accordance with a setting at a beginning of every meeting, wherein a generated transcript is displayed within a location within the floating secondary stage.

6. The system of claim 1, wherein the memory and the computer-readable instructions are further configured to cause the processor to:
   enable a private communication channel between the primary user and the support provider user within the floating secondary stage, wherein a conversation between the primary user and the support provider user occurring during the video conferencing meeting is unavailable to any other of the plurality of meeting attendees interacting via the primary stage.

7. The system of claim 1, wherein the memory and the computer-readable instructions are further configured to cause the processor to:
   enable a higher aspect ratio for the first video feed within the floating secondary stage and a lower aspect ratio for the second video feed within the primary stage.

8. The system of claim 1, wherein the memory and the computer-readable instructions are further configured to cause the processor to:
   assign a support provider role to a meeting attendee of the plurality of meeting attendees within the primary stage via a setting.

9. A method for providing a floating secondary stage during a video conferencing meeting, the method comprising:
   displaying the floating secondary stage and a primary stage associated with the video conferencing meeting, the primary stage comprising a plurality of video feeds associated with a plurality of meeting attendees;
   tethering a support provider user to a primary user;
   providing an active speaker attribution for the primary user within the primary stage while the support provider user is speaking during the video conferencing meeting on behalf of the primary user; and
   persisting a display of the floating secondary stage on a user interface device within a user-selected location while the primary stage is minimized, wherein a video feed associated with the support provider user and selected content is visible within the floating secondary stage on the user interface device for a duration of the video conferencing meeting.

10. The method of claim 9, further comprising:
maintaining a quality of the video feed associated with the support provider user at a higher priority than a quality of a second video feed displayed within the primary stage.

11. The method of claim 9, further comprising:
tethering a first user and a second user to the primary user; and
sending a meeting invitation to the tethered first user and the tethered second user upon a meeting invitation being sent to the primary user.

12. The method of claim 9, further comprising:
activating a caption automatically in accordance with a setting at a beginning of every meeting, wherein the caption is displayed within a location within the floating secondary stage.

13. The method of claim 9, further comprising:
activating a transcript service automatically in accordance with a setting at a beginning of every meeting, wherein a generated transcript is displayed within a location within the floating secondary stage.

14. The method of claim 9, further comprising:
enabling a private communication channel between the primary user and the support provider user within the floating secondary stage, wherein a conversation between the primary user and the support provider user occurring during the video conferencing meeting is unavailable to any other of the plurality of meeting attendees interacting via the primary stage.

15. The method of claim 9, further comprising:
enabling a higher aspect ratio for a first video feed within the floating secondary stage and a lower aspect ratio for a second video feed within the primary stage.

16. A computer readable storage device having computer-executable instructions for providing a floating secondary stage during a video conferencing meeting that, upon execution by a processor, cause the processor to at least:
display the floating secondary stage and a primary stage associated with the video conferencing meeting, the primary stage comprising a plurality of video feeds associated with a plurality of meeting attendees;
persist display of the floating secondary stage on a user interface device within a user-selected location while the primary stage is minimized;
tether a support provider user to a primary user; and
provide an active speaker attribution for the primary user within the primary stage while the support provider user speaks during the video conferencing meeting on behalf of the primary user.

17. The computer readable storage device of claim 16, wherein the processor further executes the computer-executable instructions to cause the processor to:
prioritize a video quality of secondary stage content within the floating secondary stage, wherein a quality of a first video feed associated with a first meeting attendee designated as the support provider user within the floating secondary stage is given a higher priority than a quality of a second video feed associated with a second meeting attendee within the plurality of video feeds associated with the plurality of meeting attendees displayed on the primary stage.

18. The computer readable storage device of claim 16, wherein the processor further executes the computer-executable instructions to cause the processor to:
tether a primary support provider video feed and a secondary support provider video feed to the floating secondary stage via a setting, wherein the primary support provider video feed and the secondary support provider video feed are displayed within the floating secondary stage.

19. The computer readable storage device of claim 16, wherein the processor further executes the computer-executable instructions to cause the processor to:
tether a first user and a second user to the primary user; and
automatically send a meeting invitation to the tethered first user and the tethered second user upon a meeting invitation being sent to the primary user.

20. The method of claim 9, further comprising:
assigning a support provider role to a meeting attendee within the primary stage via a setting.

* * * * *